(12) United States Patent
Choi

(10) Patent No.: US 12,723,928 B2
(45) Date of Patent: Sep. 1, 2026

(54) TEMPERATURE MEASUREMENT DEVICE

(71) Applicant: LS ELECTRIC CO., LTD., Anyang-si (KR)

(72) Inventor: Hyungsuk Choi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 266 days.

(21) Appl. No.: 18/291,510

(22) PCT Filed: Oct. 12, 2022

(86) PCT No.: PCT/KR2022/015409
§ 371 (c)(1),
(2) Date: Jan. 23, 2024

(87) PCT Pub. No.: WO2023/080467
PCT Pub. Date: May 11, 2023

(65) Prior Publication Data
US 2024/0377265 A1 Nov. 14, 2024

(30) Foreign Application Priority Data
Nov. 4, 2021 (KR) ........................ 10-2021-0150487

(51) Int. Cl.
*G01K 11/32* (2021.01)
*G01K 1/08* (2021.01)

(52) U.S. Cl.
CPC ................ *G01K 11/32* (2013.01); *G01K 1/08* (2013.01)

(58) Field of Classification Search
CPC . G01K 11/32; G01K 1/08; G01K 1/14; G01D 5/26
See application file for complete search history.

(56) References Cited

U.S. PATENT DOCUMENTS 10,168,227 B2 * 1/2019 Wu ........................ G01K 7/427

FOREIGN PATENT DOCUMENTS

CN 1793806 A 6/2006
CN 101387558 B * 6/2011

(Continued)

OTHER PUBLICATIONS

International Search Report for related International Application No. PCT/KR2022/015409; action dated May 11, 2023; (2 pages).

(Continued)

*Primary Examiner* — Laura Martin
*Assistant Examiner* — Julia Fitzpatrick
(74) *Attorney, Agent, or Firm* — K&L Gates LLP

(57) ABSTRACT

The present disclosure relates to a temperature measurement device, comprising: a housing having, formed therein, a space through which a power line and an optical cable penetrate, wherein the housing extends in one direction in which the power line extends; and a cable winding part which is disposed in the space of the housing and supports the power line penetrating through the housing. The cable winding part is composed of: a column member which is connected to the inner surface of the housing and extends in the space such that the optical cable penetrating through the housing is wound thereon; and a support member for at least partially supporting the outer circumference of the power line penetrating through the housing. Accordingly, a temperature measurement device having a structure that is easy to install on and separate from a power line can be provided.

17 Claims, 14 Drawing Sheets

(56) References Cited

FOREIGN PATENT DOCUMENTS

| | | | | | |
|---|---|---|---|---|---|
| CN | 104335019 | A | | 2/2015 | |
| CN | 104596669 | A | * | 5/2015 | |
| CN | 105829845 | B | * | 8/2019 | ............. G01K 7/343 |
| CN | 210072154 | U | | 2/2020 | |
| CN | 211740434 | U | * | 10/2020 | |
| CN | 112504498 | B | * | 4/2021 | ............... G01K 7/16 |
| EP | 3561457 | A1 | * | 10/2019 | ............... G01F 1/86 |
| JP | 2000504197 | A | | 4/2000 | |
| JP | 2006168458 | A | | 6/2006 | |
| JP | 2016183881 | A | | 10/2016 | |
| JP | 6141172 | B2 | * | 6/2017 | |
| JP | 6515584 | B2 | * | 5/2019 | |
| KR | 200429325 | Y1 | | 10/2006 | |
| KR | 100879035 | B1 | | 1/2009 | |
| KR | 20120018621 | A | * | 3/2012 | ............... G01K 7/02 |
| KR | 20160059744 | A | | 5/2016 | |
| KR | 20190084961 | A | * | 7/2019 | ............... G01K 7/02 |

OTHER PUBLICATIONS

Written Opinion for related International Application No. PCT/KR2022/015409; action dated May 11, 2023; (5 pages).

Office Action for related Korean Application No. 10-2021-0150487; action dated Jan. 24, 2025; (5 pages).

Office Action for related Chinese Application No. 202280051087.8; action dated Apr. 4, 2026; (9 pages).

* cited by examiner

TEMPERATURE MEASUREMENT DEVICE

CROSS-REFERENCE TO RELATED APPLICATIONS

This application is the National Stage filing under 35 U.S.C. 371 of International Application No. PCT/KR2022/015409, filed on Oct. 12, 2022, which claims the benefit of earlier filing date of and rights of priority to Korean Application 10-2021-0150487, filed on Nov. 4, 2021, the contents of which are all hereby incorporated by reference herein in their entirety.

TECHNICAL FIELD

The present disclosure relates to a temperature measurement device, and more specifically, to a temperature measurement device having a structure that allows an optical cable for measuring the temperature of a power line to be easily attached to and detached from the power line so as to accurately measure the temperature of the power line.

BACKGROUND

A transformer refers to a device that receives a voltage having a predetermined magnitude, converts it to a voltage having a different magnitude, and outputs the converted voltage. The transformer is widely used to minimize power loss while transferring power from the point of production to the site of consumption.

A power line for receiving power and transmitting power with adjusted voltage to the outside is connected to the transformer. The power line is connected in an electrically conductive manner between the transformer and the point of consumption or production.

Since the transformers and power lines are also types of devices, there is a risk of damage as the operation progresses. In general, a high-voltage current passes through the transformers and power lines, and therefore, temperature measurement may be used to detect damage to the transformers and power lines in advance and to quickly respond when an abnormality is detected.

When a transformer or power line operates normally, a temperature in a preset range, that is, a range that can be determined to be operating normally, is detected in the transformer or power line. When the temperature detected in the transformer or power line is out of the above range, it may be determined that the transformer or power line is operating abnormally so as to take an appropriate action.

In particular, optical fibers are widely used to detect heat generated from power lines. Light traveling along an optical fiber reacts sensitively to a change in temperature and changes its waveform. A change in the light waveform is transmitted to a control center or the like to allow an administrator to recognize that an abnormality has occurred in the power line. For this purpose, an optical fiber is coupled to a power line in the form of a winding.

As described above, a high-voltage current is applied to the power line. Therefore, an operation of winding an optical fiber into a power line must be performed by a skilled operator. This may cause an increase in the cost of performing an operation for measuring the temperature of the power line.

Additionally, in order to accurately measure the temperature of the power line, a length of the optical fiber wound around the power line is preferably larger than a predetermined length. As the length of the wound optical fiber increases, a separate member for fixing it to the power line may also be required.

Korean Patent Registration No. 10-0879035 discloses a multi-cable structure having an optical fiber for temperature measurement and a multi-cable case thereof. Specifically, there is disclosed a multi-cable structure in which an optical fiber for temperature measurement and a plurality of cables surrounding the optical fiber in a radial direction are arranged to detect a temperature change in one or more of the plurality of cables, and a multi-cable case thereof.

However, this type of multi-cable structure and a multi-cable case thereof must be provided with an optical fiber from the manufacturing stage. In other words, the multi-cable structure proposed in the prior literature is difficult to apply to power lines that are already in use or to power lines that have already been installed.

Korean Registered Utility Model No. 20-0429325 discloses a portable clip-integrated power cable temperature measurement device. Specifically, there is disclosed a portable clip-integrated power cable temperature measurement device, including a clip that can be fastened and coupled to a power cable and has a built-in temperature sensor that detects a temperature of the cable, and a main body that receives the detected information, to detect the temperature of the power cable.

However, such a type of power cable temperature measurement device is mainly intended for one-time measurement. That is, it is difficult to provide the power cable temperature measurement device proposed in the prior literature to continuously measure the temperature of a specific location on a power line. Therefore, the power cable temperature measurement device assumes that the temperature of the power line is manually measured by an operator.

CITATION LIST

Patent Literature

Korean Patent Registration No. 10-0879035 (Jan. 15, 2009)

Korean Registered Utility Model No. 20-0429325 (Oct. 20, 2006)

SUMMARY

Technical Problem

An aspect of the present disclosure is to provide a temperature measurement device with a structure that can solve the foregoing problems.

First, an aspect of the present disclosure is to provide a temperature measurement device with a structure that facilitates installation on and separation from a power line.

Furthermore, an aspect of the present disclosure is to provide a temperature measurement device with a structure that can prevent a safety accident from occurring during installation on and separation from a power line.

In addition, an aspect of the present disclosure is to provide a temperature measurement device with a structure that can stably maintain a state of being coupled to a power line.

Moreover, an aspect of the present disclosure is to provide a temperature measurement device with a structure that can stably support a power line and an optical cable coupled to each other.

Besides, an aspect of the present disclosure is to provide a temperature measurement device with a structure that can accurately distinguish a location to be measured.

Additionally, an aspect of the present disclosure is to provide a temperature measurement device with a structure that can be modified into various forms.

In order to achieve the above objectives, according to an embodiment of the present disclosure, there may be provided a temperature measurement device, including a housing disposed inside a space through which a power line and an optical cable pass, and disposed to extend in one direction, which is a direction in which the power line extends; and a cable winding portion disposed in the space of the housing to support the power line passed therethrough, wherein the cable winding portion includes a column member connected to an inner surface of the housing and disposed to extend in the space to wind the optical cable passed therethrough; and a support member that at least partially supports an outer periphery of the power line passed therethrough.

Furthermore, there may be provided the temperature measurement device, wherein the column member is configured such that one end portion of the column member in an extension direction thereof is coupled to an inner surface of the housing, and the other end portion in an extension direction thereof is coupled to the support member.

Furthermore, there may be provided the temperature measurement device, wherein the column member is configured such that a cross-sectional area based on a plane forming a predetermined angle with respect to an extension direction thereof is disposed to be smaller than that of the support member based on the same plane.

Furthermore, there may be provided the temperature measurement device, wherein the power line is disposed to have a predetermined cross-section and to extend in the one direction, and the support member is disposed to have a cross-sectional shape corresponding to a shape of the cross-section of the power line.

Furthermore, there may be provided the temperature measurement device, wherein the housing includes a plurality of power line through-hole portions disposed to pass through each end portion in the one direction to communicate between the space and the outside, and through which the power line passes; and a cable through-hole portion disposed to pass through an outer periphery surrounding the space to communicate between the space and the outside, and through which an optical cable for detecting the temperature of the power line passes.

Furthermore, there may be provided the temperature measurement device, wherein the cable through-hole portion includes an accommodation space disposed to pass through an outer periphery of the housing to accommodate the optical cable; a guide groove disposed to pass through the outer periphery of the housing, and to extend between the accommodation space and the outside to communicate with the accommodation space and the outside; and a fixing protrusion that protrudes toward the accommodation space from an outer periphery surrounding the accommodation space to support the optical cable accommodated in the accommodation space.

Furthermore, there may be provided the temperature measurement device, wherein the cable winding portion are provided in plurality, and the plurality of cable winding portions are disposed to be spaced apart from one another along the one direction, and the optical cable passing through the space of the housing extends after being wound around at least one cable winding portion from among the plurality of cable winding portions.

Furthermore, there may be provided the temperature measurement device, wherein the housing includes a first housing constituting a part of the other direction and having a first space therein; and a second housing constituting the remaining part of the other direction, and forming a second space that communicates with the first space to form the space of the housing therein, and the cable winding portion is provided in plurality, and the plurality of cable winding portions are disposed in at least one of the first space and the second space.

Furthermore, there may be provided the temperature measurement device, wherein the plurality of cable winding portions are disposed in each of the first space and the second space, and the plurality of cable winding portions respectively disposed in the first space and the second space are disposed to be spaced apart from one another along the one direction, and the optical cable passing through the space of the housing is wound around at least one of the plurality of cable winding portions disposed in either one of the first space and the second space, and then extends while being wound around at least one of the plurality of cable winding portions disposed in the other one of the first space and the second space.

Furthermore, there may be provided the temperature measurement device, wherein the housing includes a housing coupling portion rotatably connecting the first housing and the second housing; and a housing fastening portion provided in each of the first housing and the second housing to maintain a coupled state between the first housing and the second housing.

Furthermore, there may be provided the temperature measurement device, wherein the housing coupling portion is provided with a hinge member, and the housing fastening portion is provided with a magnetic member.

Furthermore, according to another embodiment of the present disclosure, there may be provided a temperature measurement device, including a housing disposed inside a space through which a power line and an optical cable pass, and disposed to extend in one direction, which is a direction in which the power line extends; and a cable pad portion disposed in the space of the housing to support the power line passed therethrough, wherein the cable pad portion includes a cable pad to which the optical cable is coupled to pass therethrough, and formed of an elastic material so as to be deformable in shape; and a pad support portion on which the cable pad is seated to support the power line passed therethrough, and to partially surround the space.

Furthermore, there may be provided the temperature measurement device, wherein the pad support portion includes a first extension portion extending in the other direction; a second extension portion that is continuous with the first extension portion, and extends in a rounded manner to be convex in another direction; and a third extension portion that is continuous with the second extension portion and extends in the other direction.

Furthermore, there may be provided the temperature measurement device, wherein a length of the first extension portion and the third extension portion along the another direction is disposed to be shorter than that of the housing along the another direction.

Furthermore, there may be provided the temperature measurement device, wherein a thickness of the cable pad is disposed to be less than or equal to a difference between the length of the first extension portion and the third extension portion and the length of the housing.

Furthermore, there may be provided the temperature measurement device, wherein the housing includes a first housing constituting a part of the other direction and having a first space therein; and a second housing constituting the remaining part of the other direction, and forming a second space that communicates with the first space to form the space of the housing therein, and the cable pad is provided in plurality, and the plurality of cable pad portions are disposed in the first space and the second space, respectively.

Furthermore, according to still another embodiment of the present disclosure, there may be provided a temperature measurement device, including a housing disposed inside a space through which a power line and an optical cable pass, and disposed to extend in one direction, which is a direction in which the power line extends; and a cable winding portion disposed in the space of the housing to support the power line passed therethrough, wherein the housing is configured such that either one of each of end portions along the one direction is disposed to be open, and a cross-sectional area of the other one of each of the end portions along the one direction is disposed to be smaller than that of the either one end portion, and the cable winding portion includes a column member connected to an inner surface of the housing and disposed to extend in the space to wind the optical cable passed therethrough; and a support member coupled to an end portion of the column member to at least partially support an outer periphery of the power line passed therethrough.

Furthermore, there may be provided the temperature measurement device, wherein an insulator provided in a transformer is inserted into either one of the end portions of the housing, and an inner surface of the other end portion of the housing is seated and supported on the insulator.

As described above, according to embodiments of the present disclosure, the following effects may be achieved.

First, the temperature measurement device includes a plurality of housings that are detachably coupled to each other. A first housing or a second housing may be rotatably coupled to each other, and may be rotated toward each other to be coupled or rotated opposite to each other to be separated.

When the temperature measurement device is coupled to a power line or the like, the first or second housing is rotated opposite to each other so that a space therein is exposed to the outside. The power line or the like is received in the space to be coupled to pass through the housing, and then the first or second housing is rotated toward each other to be coupled.

At this time, an optical cable for measuring the temperature of a power line or the like is accommodated in the temperature measurement device. When the first housing or the second housing is rotated toward each other to be coupled to the power line or the like, the optical cable is disposed to surround an outer periphery of the power line or the like.

Accordingly, the temperature measurement device may be coupled to or removed from a power line or the like just by being coupled to or removed from the housing, thereby facilitating installation and separation. As a result, a time period required to install and remove the temperature measurement device may be reduced, and an operation may be easily performed even when an operator's skill level is low.

Additionally, the housing that is brought into direct contact with the operator is formed of an insulating material. As described above, the housing is composed of a plurality of partially detachable members. The operator may manipulate the first housing or the second housing to insert a power line into an open space, and then manipulate the first housing or the second housing to couple the temperature measurement device to the power line.

That is, a contact between the operator and the power line or the like may be minimized during the process of installing the temperature measurement device. Accordingly, the occurrence of a safety accident may be prevented when the temperature measurement device is coupled to or separated from a power line.

Furthermore, the temperature measurement device is provided with a housing fastening portion. The housing fastening portion is provided in each of the first housing and the second housing to stably maintain a coupled state between the first housing and the second housing. As long as an external force exceeding a predetermined value is not applied, the first housing and the second housing may be maintained in a coupled state.

Therefore, a coupled state between the temperature measurement device and the power line may be maintained stably. Furthermore, a power line accommodated in the temperature measurement device and an optical cable for measuring the temperature of the power line may not affected by an external environment, thereby improving the reliability of temperature measurement.

In addition, in one embodiment, the temperature measurement device is provided with a cable winding portion. The cable winding portion includes a column member that is coupled to and extends from the housing, and a support member located at one end portion of the column member and disposed to have a larger cross-sectional area than the column member to support a power line.

An optical cable is wound around the column member and is prevented from swinging arbitrarily, and is prevented from being released into an inner space of the housing by the support member. The support member may be disposed to have a cross-sectional area in the same shape as an outer periphery of the power line to support the outer periphery of the power line.

Furthermore, in another embodiment, the temperature measurement device is provided with a cable pad portion. The cable pad portion is formed of an elastic material, and includes a cable pad to which an optical cable is coupled to pass therethrough and a pad support portion that supports the cable pad.

The optical cable is coupled to the cable pad so as not to swing arbitrarily or so as not to be released to the outside. The power line accommodated in the housing may be supported by the pad support portion, and the cable pad is located therebetween to allow the cable pad to be pressed toward the pad support portion and to be deformed in shape so as to be stably seated on the pad support portion.

Accordingly, an optical cable coupled to the temperature measurement device may be stably maintained in a wound state or in a coupled state to a cable pad. Likewise, the outer periphery of the power line may be stably supported by the cable winding portion or the cable pad portion, thereby stably maintaining a coupled state between the temperature measurement device and the optical cable or power line.

Additionally, the temperature measurement device includes an anti-slip portion. The anti-slip portion is configured to maintain a relative position between the power line and the temperature measurement device. That is, the temperature measurement device coupled to the power line does not arbitrarily move or swing.

Therefore, the temperature measurement device may be accurately maintained at a target position where temperature is to be measured on an extending power line. Accordingly, the temperature measurement device may acquire information on the temperature of an exact location where temperature measurement is required.

In addition, in various embodiments, the temperature measurement device may have various coupling and support structures with respect to the power line. The temperature measurement device may be provided in the form of a case to accommodate a power line in an inner space thereof. In another embodiment, the temperature measurement device may be provided in the form of an insulating cup and coupled to a power line in the form of covering an insulator provided in a transformer.

Therefore, a design freedom of the temperature measurement device may be improved. Furthermore, the location and member where the temperature measurement device is installed may be configured in various ways.

BRIEF DESCRIPTION OF THE DRAWINGS

FIG. 8 is an open front view showing the temperature measurement device of FIG. 7.

DETAILED DESCRIPTION

Figure 1:
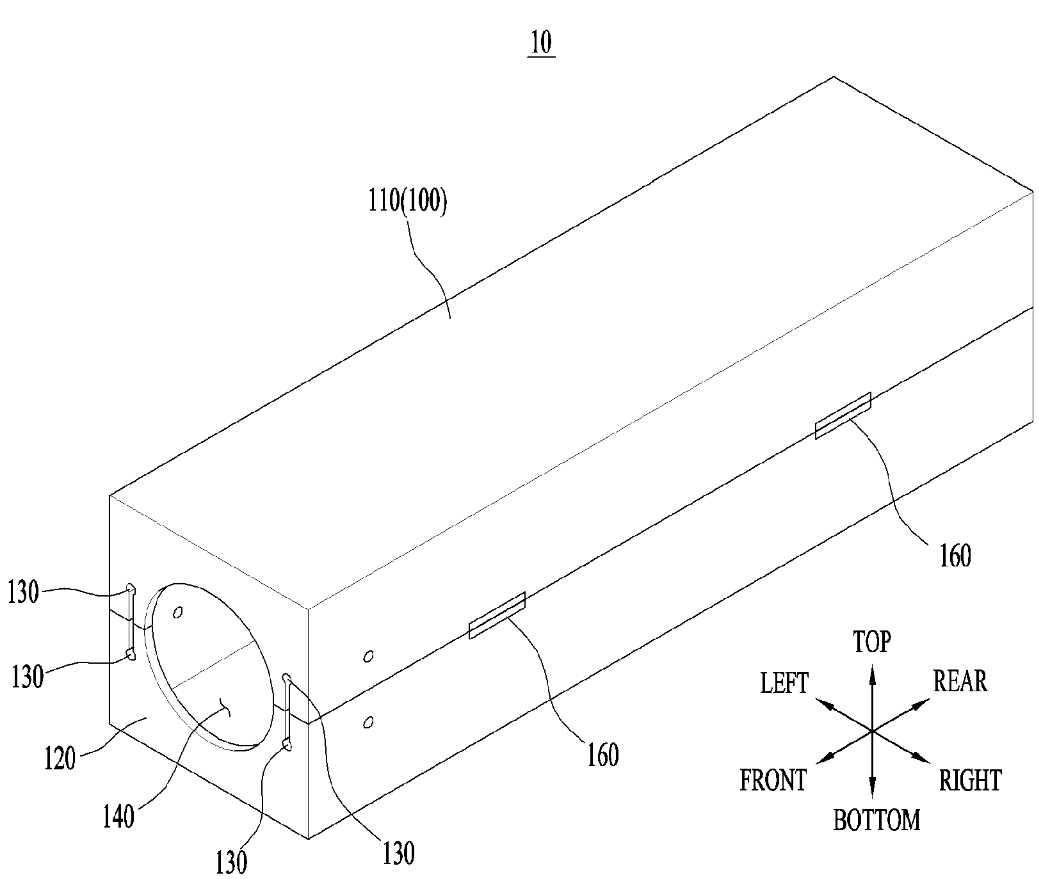
FIG. 1 is a perspective view showing a temperature measurement device according to an embodiment of the present disclosure.

Hereinafter, a temperature measurement device 10, 20, 30 according to embodiments of the present disclosure will be described in detail with reference to the accompanying drawings.

In the following description, a description of some components may be omitted to clarify the characteristics of the present disclosure.

1. Definition of Terms

The term "communication" used in the following description denotes that one or more members are connected to each other in fluid communication. In one embodiment, communication may be formed by a member such as a conduit, pipe, or duct.

The term "conduction" used in the following description denotes that one or more members are connected to each other to transfer an electrical current or electrical signal. In one embodiment, conduction may be formed in a wired manner using a conductor member, or in a wireless manner such as Bluetooth, Wi-Fi, or RFID.

The terms "upper", "lower", "right", "left", "front" and "rear" used in the following description will be understood with reference to the coordinate system shown in FIGS. 1, 2, 4, 5, 9 and 11.

Hereinafter, it will be described on the assumption that the temperature measurement device 10, 20, 30 according to embodiments of the present disclosure is used in coupling to a power line W. However, it will be understood that the temperature measurement devices 10, 20, 30 according to each embodiment may be applied not only to the power line W, but also to any member that can be coupled thereto to surround an outer periphery thereof.

2. Description of Temperature Measurement Device 10, 20, 30 According to Embodiment of Present Disclosure The temperature measurement device 10, 20, 30 according to an embodiment of the present disclosure may be removably coupled to a power line W. When the temperature measurement device 10, 20, 30 is coupled to the power line W, an optical cable C wound around the temperature measurement device 10, 20, 30 may be disposed to surround the power line W.

Accordingly, a change in temperature of the power line W may be detected through a change in a wavelength of light traveling in the optical cable C.

The temperature measurement device 10, 20, 30 may be provided in plurality. The plurality of temperature measurement devices 10, 20, 30 may be provided at different positions of an extending power line W to measure the temperature of the power line W.

The installed temperature measurement devices 10, 20, 30 may be maintained in predetermined positions by an anti-slip portion 40.

Accordingly, the temperature measurement devices 10, 20, 30 may be maintained at points where the temperature is to be measured, thereby making it possible to accurately measure temperatures at the predetermined points.

Hereinafter, the configuration of the temperature measurement devices 10, 20, 30 according to an embodiment of the present disclosure will be described in detail with reference to FIGS. 1 to 8.

(1) Description of Temperature Measurement Device 10 According to One Embodiment of Present Disclosure Referring to FIGS. 1 to 4, a temperature measurement device 10 according to one embodiment of the present disclosure is shown. The temperature measurement device 10 according to this embodiment supports the power line W, and is provided with a member for stably placing the optical cable C at an outside of the supported power line W.

Therefore, the temperature measurement device 10 according to this embodiment may accurately detect a temperature change in the power line W while stably supporting the power line W.

The optical cable C is wound inside the temperature measurement device 10. The wound optical cable C is disposed adjacent to the power line W. The aspect of light traveling along the optical cable C changes depending on the temperature change of the power line W to detect an abnormality in the power line W.

The temperature measurement device 10 may be removably coupled to the power line W. As will be described later, an interior of the temperature measurement device 10 may be opened by the housing coupling portion 150. Additionally, after the temperature measurement device 10 is inserted into the power line W, a coupled state therebetween may be stably maintained by the housing fastening portion 160.

In the illustrated embodiment, the temperature measurement device 10 includes a housing 100, a cable winding portion 200, and an anti-slip portion 400.

The housing 100 constitutes an outer shape of the temperature measurement device 10. A space is formed inside the housing 100. Other elements of the temperature measurement device 10, such as the cable winding portion 200, may be accommodated in the space.

Additionally, the optical cable C may be accommodated in the space. The optical cable C may extend from an outside of the housing 100 toward an inner space of the housing 100 and then extend back to the outside of the housing 100.

Here, a total length of the optical cable C located in an inner space of the housing 100 may be equal to or greater than a predetermined length. In one embodiment, the predetermined length may be 30 cm. Accordingly, a temperature change of the power line W may be detected more accurately.

The space of the housing 100 communicates with the outside. The optical cable C and power line W may be partially accommodated in the space of the housing 100.

The housing 100 accommodates the optical cable C and may have any shape capable of being coupled to the power line W. In the illustrated embodiment, the housing 100 has a cross-section in which a length in one direction, that is, a front-to-rear direction, is larger than that in the other direction, that is, a left-right direction, and is provided in a square pillar shape having a height in a top-bottom direction.

The housing 100 may be formed of an insulating material. This is to prevent an accident caused by damage due to a high-voltage current flowing through the power line W or the current being arbitrarily exposed to the outside.

The housing 100 may be formed of a lightweight yet highly rigid material. Since the housing 100 is exposed to the outside, damage due to an external environment is prevented.

In one embodiment, the housing 100 may be formed of an insulating synthetic resin material.

The housing 100 may be assembled or disassembled by an operator. To this end, the housing 100 may be configured with a plurality of elements.

In the illustrated embodiment, the housing 100 includes a first housing 110, a second housing 120, a cable through-hole portion 130, a power line through-hole portion 140, a housing coupling portion 150, and a housing fastening portion 160.

The first housing 110 and the second housing 120 are coupled to each other to constitute an outer shape of the housing 100.

The first housing 110 constitutes one side of the housing 100. In the illustrated embodiment, the first housing 110 constitutes an upper side of the housing 100.

The second housing 120 constitutes the other side of the housing 100. In the illustrated embodiment, the second housing 120 constitutes a lower side of the housing 100.

The first housing 110 and the second housing 120 may be coupled to each other. That is, in the embodiment shown in FIG. 1, the first housing 110 and the second housing 120 are coupled to each other so that other elements except the power line W and the optical cable C are not exposed to the outside.

Figure 2:
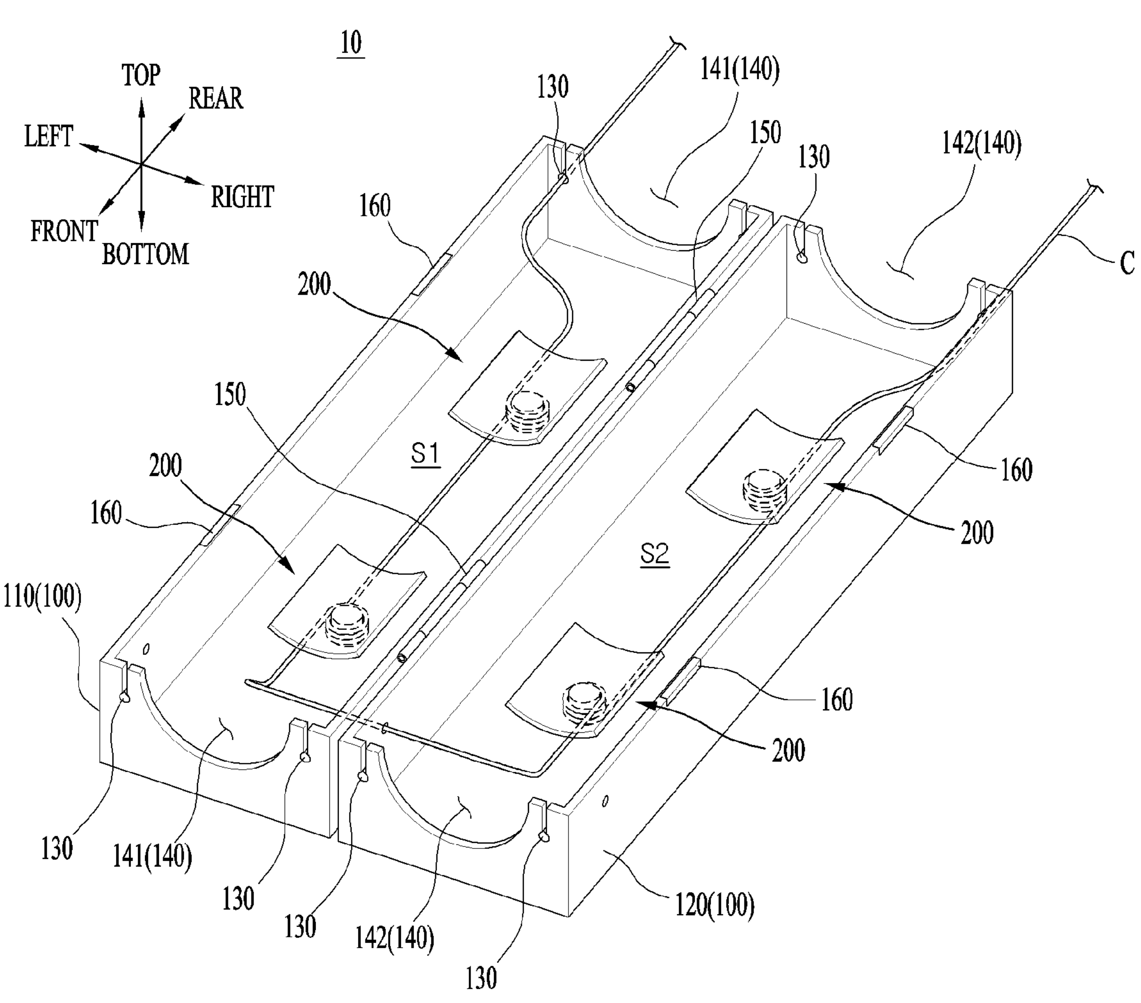
FIG. 2 is a perspective view showing the temperature measurement device according to one embodiment of the present disclosure.

In the embodiment shown in FIG. 2, the first housing 110 and the second housing 120 may be separated from each other to allow an inner space of the housing 100 to be exposed to the outside. The operator may configure the first housing 110 and the second housing 120 in the state shown in FIG. 2 to couple the temperature measurement device 10 to the power line W.

The first housing 110 and the second housing 120 may be coupled to each other to allow a space therein to be exposed to the outside. In the embodiment shown in FIGS. 1 to 3, the first housing 110 and the second housing 120 are rotatably coupled to each other by the housing coupling portion 150. In the above embodiment, the first housing 110 and the second housing 120 may be hinge-fitted to each other.

Although not shown, the first housing 110 and the second housing 120 may be provided in a completely detachable manner from each other. That is, the temperature measurement device 10 may be configured by coupling the first housing 110 and the second housing 120 that are separated from each other while surrounding the power line W. In the above embodiment, the first housing 110 and the second housing 120 may be maintained in a coupled state by a magnet or the like.

As shown in FIG. 2, the first housing 110 and the second housing 120 may be disposed to be symmetrical with respect to a length direction of the housing 100, or in a front-to-back direction in the illustrated embodiment. This is due to the fact that the power line W accommodated inside the first housing 110 and the second housing 120 is disposed to have a circular cross-section.

Figure 3:
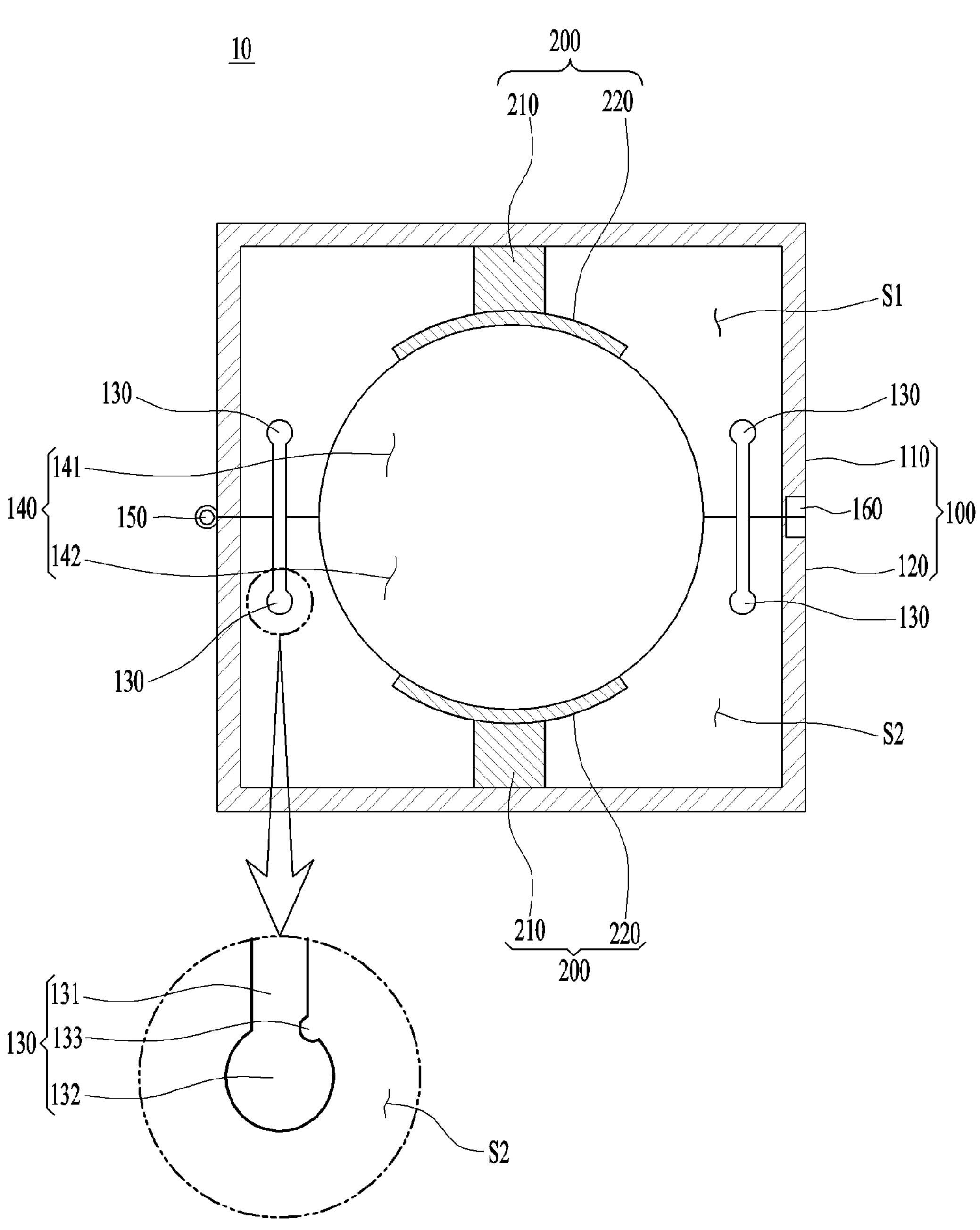
FIG. 3 is a cross-sectional view showing the temperature measurement device of FIG. 2.

Spaces are formed inside the first housing 110 and the second housing 120, respectively. Specifically, as shown in FIGS. 2 and 3, a first space S1 is formed inside the first housing 110 and a second space S2 is formed inside the second housing 120.

The power line W and the optical cable C are partially accommodated in the first space S1 and the second space S2, respectively. The first space S1 and the second space S2 communicate with each other to form an inner space of the housing 100.

Accordingly, it can be said that the power line W and the optical cable C are accommodated in the first space S1 and the second space S2.

The first space S1 and the second space S2 may be formed in shapes corresponding to the shapes of the first housing 110 and the second housing 120. In the illustrated embodiment, the first space S1 and the second space S2 are formed to extend longer in a front-rear direction, similar to the shapes of the first housing 110 and the second housing 120.

The cable winding portion 200 and the anti-slip portion 400 may be accommodated inside the first space S1 and the second space S2. A detailed description thereof will be provided later.

The cable through-hole portion 130 functions as a passage for the optical cable C to enter an inner space of the housing

100 from the outside, that is, the first space S1 or the second space S2. The cable through-hole portion 130 communicates between an inner space of the housing 100 and the outside.

The cable through-hole portion 130 is disposed to pass through an outer peripheral surface of the housing 100. In other words, the cable through-hole portion 130 is disposed to pass through a surface of the housing 100 surrounding the first space S1 or the second space S2. The cable through-hole portion 130 communicates between the first space S1 or the second space S2 and the outside.

In the illustrated embodiment, the cable through-hole portions 130 are disposed on front and rear side surfaces of the housing 100, respectively. In other words, the cable through-hole portion 130 is disposed to pass through an end surface in the extension direction from among surfaces of the housing 100 surrounding the first space S1 or the second space S2.

In the illustrated embodiment, the cable through-hole portion 130 is disposed such that the optical cable C extends into the first space S1 or the second space S2 along an extension direction of the housing 100, that is, an extension direction of the power line W.

Alternatively, the cable through-hole portion 130 may be disposed in a direction different from the extension direction of the power line W to allow the optical cable C to extend in the other direction. In the above embodiment, the optical cable C is preferably disposed to have a sufficient curvature to prevent damage to the optical cable C.

The cable through-hole portion 130 may be provided in plurality. The plurality of cable through-hole portions 130 may be disposed at different positions to function as passages for the optical cable C to pass therethrough.

In the illustrated embodiment, a pair of cable through-hole portions 130 may be disposed on front and rear sides of the first housing 110 and the second housing 120, respectively, so as to provide a total of eight cable through-hole portions 130, but a number thereof may be changed.

A pair of cable through-hole portions 130, that is, a pair of cable through-hole portions 130 disposed on a front or rear side surface of the first housing 110 or the second housing 120, are disposed to be spaced apart from each other. In the illustrated embodiment, a pair of cable through-hole portions 130 are disposed to face each other with the power line through-hole portion 140 through which the power line W passes therebetween.

Accordingly, the optical cable C extending into an inner space of the housing 100 through the cable through-hole portion 130 may be located adjacent to the power line W. As a result, a temperature change in the power line W may be detected quickly and accurately.

In the illustrated embodiment, the cable through-hole portion 130 includes a guide groove 131, an accommodation space 132, and a fixing protrusion 133 (best shown in FIG. 3).

The guide groove 131 communicates between the accommodation space 132 and the outside. The optical cable C may pass through the guide groove 131 to move along the guide groove 131 so as to enter the accommodation space 132.

The guide groove 131 extends in one direction, or in a top-bottom direction in the illustrated embodiment. The guide groove 131 may extend to pass through an outer peripheral surface of the housing 100 in an arbitrary direction that can communicate between the accommodation space 132 and the outside.

In the illustrated embodiment, the guide groove 131 extends in a straight line shape. Alternatively, the guide groove 131 may be disposed to include at least one curved portion or bent portion. In the above embodiment, a movement path of the optical cable C moving through the guide groove 131 may be diversified to prevent the optical cable C from being arbitrarily released.

A cross-sectional area of the guide groove 131 may be disposed to be less than or equal to that of the optical cable C or that of the accommodation space 132.

Typically, an outer peripheral surface of the optical cable C is formed of a flexible material to be deformable in a predetermined shape. Accordingly, the optical cable C may store a restoring force through a predetermined shape deformation while moving along the guide groove 131, and return to its original shape upon reaching the accommodation space 132. In the above embodiment, the optical cable C may be stably maintained in the accommodation space 132.

The accommodation space 132 is a space in which the optical cable C moved along the guide groove 131 is accommodated. The accommodation space 132 is disposed to pass through an outer peripheral surface of the housing 100.

The accommodation space 132 communicates with the outside. Specifically, the accommodation space 132 communicates with the outside by means of the guide groove 131. The optical cable C inserted into the guide groove 131 may be moved to the accommodation space 132.

The accommodation space 132 may have an arbitrary shape that can stably accommodate the optical cable C. In the illustrated embodiment, the accommodation space 132 is disposed in a disk shape having a circular cross-section and a height in a top-bottom direction. This is due to the fact that the optical cable C is typically disposed to have a circular cross-section.

A cross-sectional area of the accommodation space 132 may be greater than or equal to that of the optical cable C. This is to cushion the swing of the optical cable C accommodated in the accommodation space 132 by a predetermined amount even when the temperature measurement device 10 is swung.

The fixing protrusion 133 is provided on an outer peripheral surface surrounding the accommodation space 132.

The fixing protrusion 133 presses and supports an outer peripheral surface of the optical cable C accommodated in the accommodation space 132 to prevent the optical cable C from being arbitrarily released.

The fixing protrusion 133 is disposed to protrude toward the accommodation space 132 from the outer peripheral surface surrounding the accommodation space 132. In the illustrated embodiment, the fixing protrusion 133 may be located on an upper right side of the accommodation space 132, but its location may be changed.

The fixing protrusion 133 may be located adjacent to a portion where the guide groove 131 and the accommodation space 132 communicate with each other. Since the guide groove 131 is disposed to have a smaller cross-sectional area than the accommodation space 132, the effect of preventing the optical cable C from being released may be further improved through providing the fixing protrusion 133.

The fixing protrusion 133 may have an arbitrary shape capable of stably maintaining the position of the optical cable C. In the illustrated embodiment, the fixing protrusion 133 may be disposed in a rounded convex manner toward the accommodation space 132, but its shape may be changed to a polygonal shape such as a triangle, a square, or an oval shape.

The power line through-hole portion 140 functions as a passage for the power line W to advance into an inner space of the housing 100. The power line through-hole portion 140 communicates between an inner space of the housing 100 and the outside.

The power line through-hole portion 140 may have an arbitrary shape through which the power line W can pass. In the illustrated embodiment, the power line through-hole portion 140 may be disposed to have a circular cross-section, which may change depending on the cross-sectional shape of the power line W.

The power line through-hole portion 140 may be disposed to pass through any one or more surfaces surrounding the inner space. In the illustrated embodiment, the power line through-hole portions 140 are disposed on front and the rear side surfaces.

The power line through-hole portion 140 may be disposed in plurality. The plurality of power line through-hole portions 140 may be disposed at different positions. In the illustrated embodiment, the power line through-hole portion 140 includes a first power line through-hole portion 141 disposed in the first housing 110 and a second power line through-hole portion 142 disposed in the second housing 120.

The first power line through-hole portion 141 may be provided in plurality. The plurality of first power line through-hole portions 141 may be disposed in different portions of the first housing 110. In the illustrated embodiment, the first power line through-hole portions 141 are disposed on front and rear side surfaces of the first housing 110, respectively. The plurality of first power line through-hole portions 141 are disposed to face each other with the first space S1 therebetween.

In an embodiment in which the power line through-hole portion 140 has a circular cross-section, a pair of first power line through-hole portions 141 facing each other may be disposed to have the same central axis.

The second power line through-hole portion 142 may be provided in plurality. The plurality of second power line through-hole portions 142 may be disposed in different portions of the second housing 120. In the illustrated embodiment, the second power line through-hole portions 142 are disposed on front and rear side surfaces of the second housing 120, respectively. The plurality of second power line through-hole portions 142 are disposed to face each other with the second space S2 therebetween.

In an embodiment in which the power line through-hole portion 140 is disposed to have a circular cross-section, a pair of power line through-hole portions 142 facing each other may be disposed to have the same central axis.

As the first housing 110 and the second housing 120 are coupled to each other, the first power line through-hole portion 141 and the second power line through-hole portion 142 may communicate with each other to constitute the power line through-hole portion 140.

In the embodiment shown in FIGS. 1 and 3, the power line through-hole portion 140 is disposed to have a circular cross-section. In the above embodiment, the first power line through-hole portion 141 and the second power line through-hole portion 142 may be disposed to have an arc shape with the same curvature and radius of an outer periphery thereof.

The housing coupling portion 150 couples the first housing 110 and the second housing 120 to allow a relative movement with respect to each other. The first housing 110 and the second housing 120 may maintain a state of being coupled to each other and a relative position therebetween may be changed.

The housing coupling portion 150 is coupled to the first housing 110 and the second housing 120, respectively. In the embodiment shown in FIG. 2, the housing coupling portion 150 couples the first housing 110 and the second housing 120 to be rotatable relative to each other. In the above embodiment, the housing coupling portion 150 may be provided as a hinge member.

The conductive protruding portion 150 may be provided in plurality. The plurality of housing coupling portions 150 may be respectively coupled to the first housing 110 and the second housing 120 at different positions.

In the embodiment shown in FIG. 2, two housing coupling portions 150 are provided and disposed to be spaced apart from each other in a direction in which the housing 100 extends, or in a front-rear direction in the illustrated embodiment.

The shape, number, and arrangement method of the housing coupling portion 150 may change depending on an environment in which the temperature measurement device 10 is provided.

The housing fastening portion 160 maintains the first housing 110 and the second housing 120 in a state of being in contact with each other. In other words, the housing fastening portion 160 maintains a state in which the first space S1 and the second space S2 are located adjacent to each other to communicate with each other, and surrounded by the housing 100.

The housing fastening portion 160 may be provided in the first housing 110 or the second housing 120. In the embodiment shown in FIG. 2, the housing fastening portion 160 may be provided in both the first housing 110 and the second housing 120.

The hosing fastening portions 160 may be provided in plurality. The plurality of housing fastening portions 160 may be disposed at different positions. Any one of the plurality of housing fastening portions 160 may be coupled to the other one thereof.

In the embodiment shown in FIG. 2, the housing fastening portions 160 provided in the first housing 110 are disposed to be spaced apart from each other in an extension direction of the housing 100, or in a front-rear direction in the illustrated embodiment. The housing fastening portions 160 provided in the second housing 120 are also disposed to be spaced apart from each other in an extension direction of the housing 100, or in a front-rear direction in the illustrated embodiment.

The housing fastening portions 160 may be provided in any shape of being coupled to each other by an external force and maintained in that state, and being separated again from each other by an external force.

In one embodiment, the housing fastening portion 160 may be provided with a magnetic member that maintains a coupled state between the first housing 110 and the second housing 120 using magnetic attraction.

In another embodiment, the housing fastening portions 160 may be provided to be coupled to each other in a snap-fit or force-fit manner.

The cable winding portion 200 winds the optical cable C extending into an inner space of the housing 100. The optical cable C is wound around the cable winding portion 200 so as not to be arbitrarily spread in the inner space of the housing 100.

That is, the cable winding portion 200 functions as a reel for winding the optical cable C.

Additionally, the cable winding portion 200 supports the power line W extending into the inner space of the housing 100. Specifically, the cable winding portion 200 partially supports an outer periphery of the power line W passed through the housing 100. Accordingly, a coupled state of the temperature measurement device 10 and the power line W may be stably maintained.

The cable winding portion 200 is coupled to the housing 100. Specifically, the cable winding portion 200 is disposed in a space formed inside the housing 100. One side of the cable winding portion 200 is coupled to one surface of the housing 100 surrounding the space, and the other side of the cable winding portion 200 is disposed to be spaced apart from the one surface of the housing 100.

The cable winding portion 200 may be provided in plurality. The plurality of cable winding portions 200 may be disposed at different positions, in which each of the plurality of cable winding portions 200 may be configured to wind the optical cable C.

In the embodiment shown in FIG. 2, a total of four cable winding portions 200 are provided, with one pair in the first housing 110 and one pair in the second housing 120.

A pair of cable winding portions 200 disposed in the first housing 110 are disposed to be spaced apart from each other in an extension direction of the housing 100, or in a front-rear direction in the illustrated embodiment. A pair of cable winding portions 200 disposed in the second housing 120 are also disposed to be spaced apart from each other in an extension direction of the housing 100, or in a front-rear direction in the illustrated embodiment.

Here, as will be described later, the cable winding portions 200 may be disposed so that the center of the support member 220 is located on the same axis as the center of the power line through-hole portion 140.

In the illustrated embodiment, the cable winding portion 200 includes a column member 210 and a support member 220.

The column member 210 is a portion in which the cable winding portion 200 is coupled to the housing 100. The column member 210 is coupled to one surface of the housing 100. The column member 210 extends toward an inner space of the housing 100.

As described above, a plurality of cable winding portions 200 may be provided to be coupled to the first housing 110 and the second housing 120, respectively.

Referring to FIG. 2, the column member 210 coupled to the first housing 110 is coupled to one surface of the first housing 110 partially surrounding the first space S1, or a top surface in the illustrated embodiment. The column member 210 extends from the one surface of the first housing 110 toward the first space S1.

Furthermore, the column member 210 coupled to the second housing 120 is coupled to one surface of the second housing 120 partially surrounding the second space S2, or a bottom surface in the illustrated embodiment. The column member 210 extends from the one surface of the second housing 120 toward the second space S2.

Here, an extended length of the column member 210 may be determined according to a distance between the support members 220 facing each other while the first housing 110 and the second housing 120 are coupled to each other.

That is, referring to FIG. 3, the power line through-hole portion 140 accommodating the power line W is located between the supporting members 220 facing each other. The column member 210 may be extended so that the distance between the support members 220 facing each other is greater than or equal to a diameter of the power line W. In other words, in one embodiment, the column member 210 may be extended so that a distance between end portions of the column members 210 facing each other is greater than or equal to the diameter of the power line W.

Accordingly, the power line W may be located between the power line through-hole portion 140 and the pair of cable winding portions 200 disposed to face each other so as to be stably supported by the cable winding portions 200.

The optical cable C is wound around the column member 210. Here, the optical cable C extending into an inner space of the housing 100 through any one of the cable through-hole portions 130 may be wound around any one of the plurality of column members 210, and then extended to another column member 210.

The above process may be repeated such that a single optical cable C is wound around each of the plurality of column members 210 and extended, and then extended again to an outside of the housing 100 through the cable through-hole portion 130. Accordingly, the optical cable C may be supported by the plurality of column members 210, thereby preventing the twisting of the optical cable C in the inner space of the housing 100.

Here, the optical cable C may be extended in various ways and wound around each of the plurality of column members 210.

In the embodiment shown in FIG. 2, the optical cable C extends into the first space S1 of the first housing 110 through the cable through-hole portion 130 located on a rear side of the first housing 110. The optical cable C is wound around the column member 210 located relatively on a rear side, then extended, and wound again around the column member 210 located on a front side.

Next, the optical cable C extends toward the second space S2 of the second housing 120. In FIG. 2, it is shown that the optical cable C advances beyond the walls of the first housing 110 and the second housing 120. Alternatively, a separate member may be provided to form an extension path of the optical cable C.

The optical cable C extending to the second space S2 is wound around the column member 210 located on a front side, then extended, and wound again around the column member 210 located on a rear side. The optical cable C wound around all the column members 210 extends to an outside of the housing 100 through the cable through-hole portion 130 disposed on a rear side of the second housing 120.

An extension form of the optical cable C may be changed. For example, the optical cable C may extend to alternately pass through the first space S1 and the second space S2. Alternatively, the optical cable C may be alternately wound multiple times around each pair of the column members 210 coupled to either one of the first housing 110 and the second housing 120, and then alternately wound again multiple times around each pair of the column members 210 coupled to the other one thereof.

The optical cable C may be located adjacent to the power line W and extended in an arbitrary shape that can extend in the inner space of the housing 100 by a sufficient length to detect the temperature of the power line W. In one embodiment, the sufficient length is 30 cm or more as described above.

The column member 210 may have an arbitrary shape in which the optical cable C can be wound. In the embodiment shown in FIG. 4, the column member 210 has a cylindrical shape that has a circular cross-section in a horizontal direction and extends in a top-bottom direction. In the above embodiment, a lower end portion of the column member 210 is coupled to the housing 100, and an upper end portion of the column member 210 is coupled to the support member 220.

The support member 220 supports the power line W passed through the housing 100. Additionally, the support member 220 is configured to prevent the optical cable C wound around the column member 210 from being arbitrarily released.

The support member 220 is coupled to the column member 210. In the illustrated embodiment, the support member 220 is located at one end portion of the column member 210 opposite to the housing 100. In other words, the support member 220 is disposed to face one surface of the first housing 110 surrounding the first space S1 or one surface of the second housing 120 surrounding the second space S2, with the column member 210 therebetween.

The power line W is seated on the support member 220. The support member 220 is disposed to surround an outer periphery of the power line W coupled to the housing 100 to pass therethrough.

The support member 220 may be disposed to have a shape corresponding to the outer periphery of the power line W. In the embodiment shown in FIG. 4, the support member 220 is disposed to include a curved portion, which is due to the power line W being disposed in a cylindrical shape having a circular cross-section. In the above embodiment, the curved portion included in the support member 220 may be disposed such that the center thereof is disposed on the same axis as that of the power line through-hole portion 140. In other words, the curvature and radius of a curved surface included in the support member 220 may be determined to correspond to the curvature and radius of the power line through-hole portion 140.

The shape of the support member 220 may change depending on the shape of the power line W.

The support member 220 is disposed to have a larger cross-sectional area than the column member 210. Therefore, the movement of the optical cable C wound around the column member 210 in a direction toward the power line W, that is, a lower side of the first housing 110 or an upper side of the second housing 120, is restricted due to the support member 220.

Accordingly, the optical cable C wound around the column member 210 may be maintained in a stably wound state.

The support member 220 may be provided in an arbitrary shape capable of supporting the power line W and preventing the wound optical cable C from being arbitrarily released.

Figure 4:
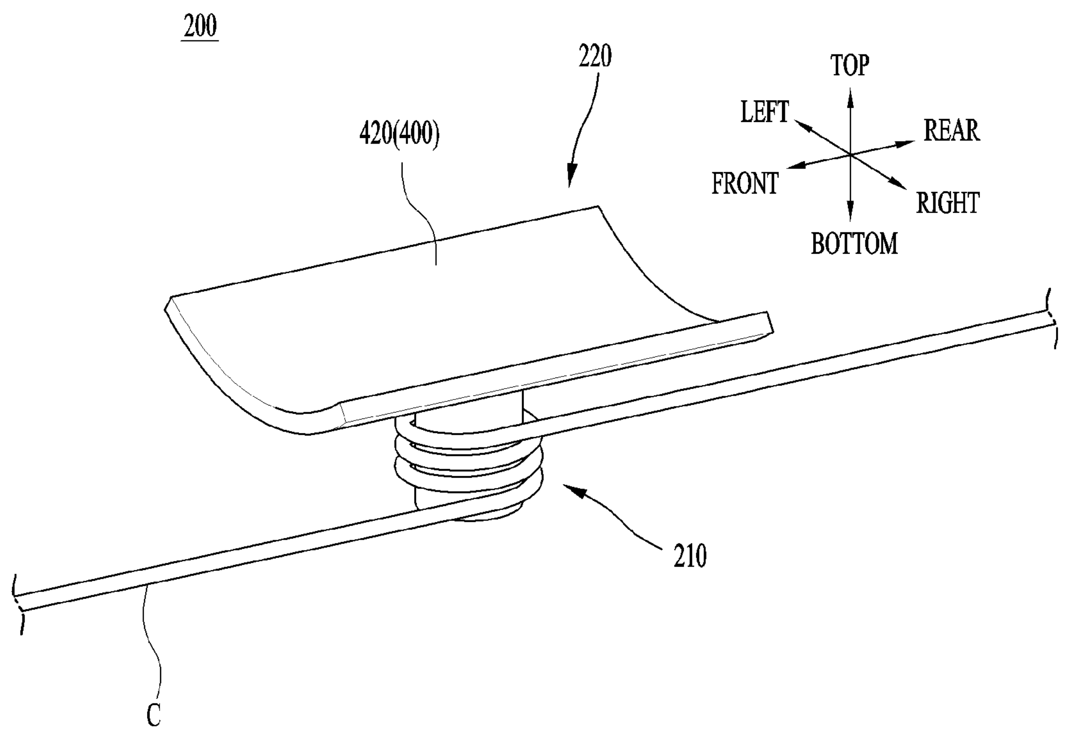
FIG. 4 is a perspective view showing a cable winding portion provided in the temperature measurement device of FIG. 2.

Among surfaces of the support member 220, a surface facing the power line W or an upper surface in the embodiment shown in FIG. 4 may be provided with the anti-slip portion 400.

The anti-slip portion 400 maintains a contact state between the temperature measurement device 10 and the power line W. The power line W coupled to the temperature measurement device 10 to pass therethrough may be maintained at an intended position without slipping by the anti-slip portion 400.

The anti-slip portion 400 may be provided in a form that increases a frictional force between the cable winding portion 200 and the power line W. In the embodiment shown in FIG. 4, the anti-slip portion 400 is provided in the form of a friction member 420.

In the above embodiment, the anti-slip portion 400 is located to cover one surface of the support member 220, or a top surface in the illustrated embodiment. It will be understood that the one surface of the support member 220 is a surface surrounding an outer periphery of the power line W coupled thereto to pass therethrough.

The anti-slip portion 400 may be provided as a separate member, and provided to be coupled to the power line W. That is, in the embodiment shown in FIG. 14, the anti-slip portion 400 is provided in the form of a clip member 410 coupled to the power line W on an outer side of the housing 100 in a length direction.

In the above embodiment, the anti-slip portion 400 may be provided in plurality to fix the position of the housing 100 located therebetween in a length direction.

It will be understood that the anti-slip portion 400 may be applied not only to the temperature measurement device 10 according to this embodiment, but also to the temperature measurement devices 20, 30 according to another embodiment and still another embodiment.

Figure 5:
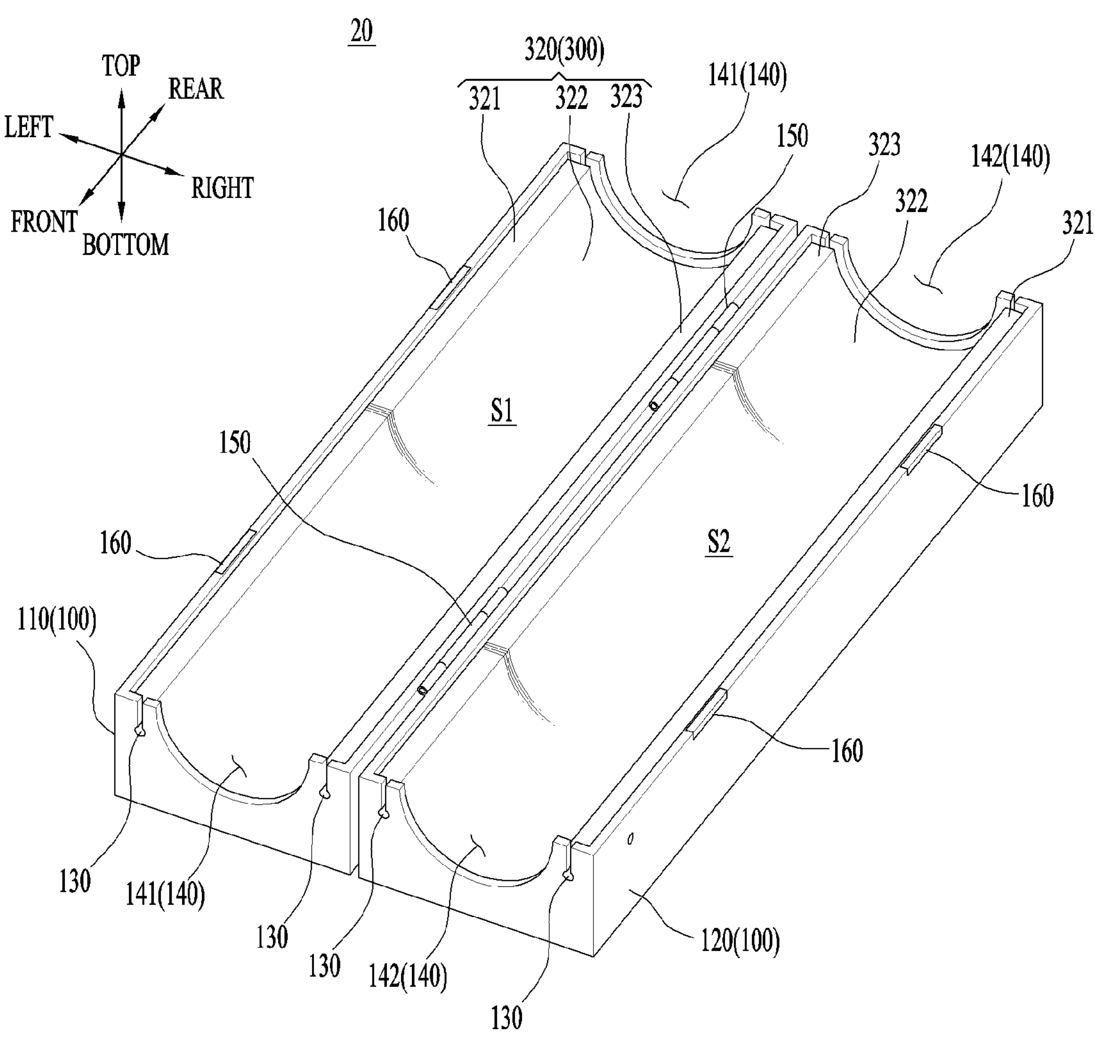
FIG. 5 is a perspective view showing a temperature measurement device according to another embodiment of the present disclosure.
Figure 6:
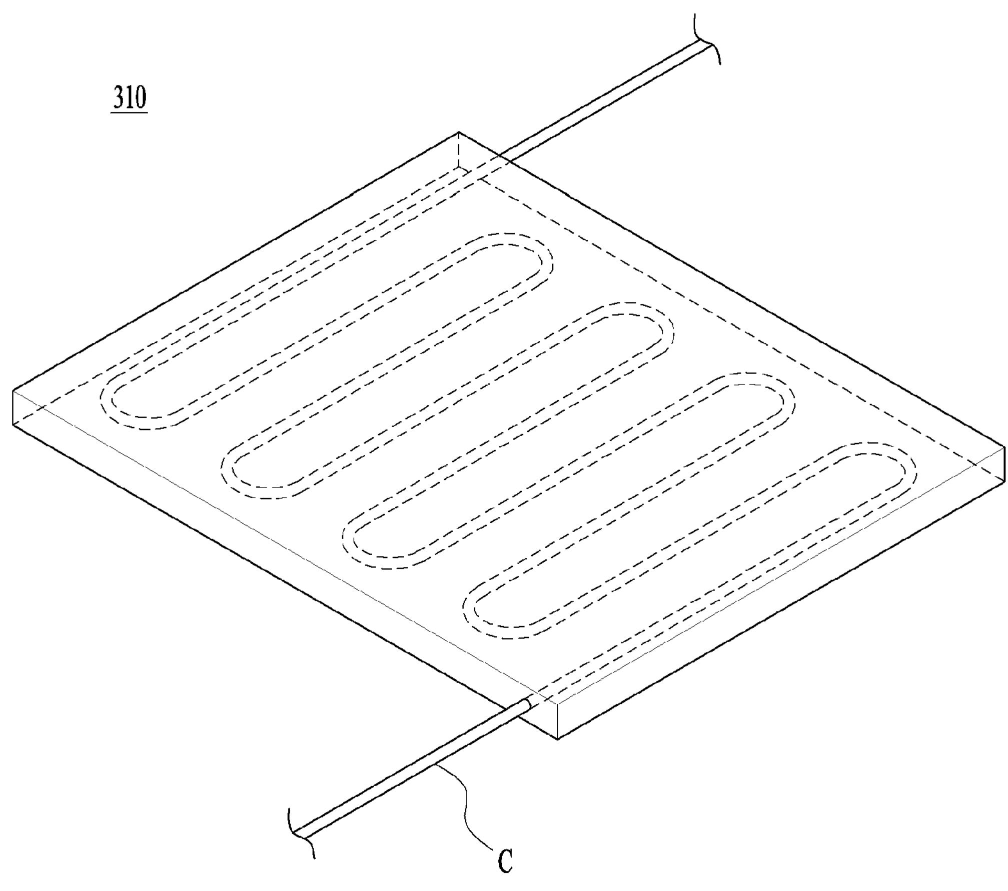
FIG. 6 is a perspective view showing a cable pad accommodated in the temperature measurement device of FIG. 5.

(2) Description of Temperature Measurement Device 20 According to Another Embodiment of Present Disclosure Referring to FIGS. 5 and 6, a temperature measurement device 20 according to another embodiment of the present disclosure is shown.

When compared to the temperature measurement device 10 according to the foregoing embodiment, the temperature measurement device 20 according to this embodiment has differences in the coupling and support structure of the optical cable C and the support structure of the power line W.

Accordingly, differences between the temperature measurement device 20 according to this embodiment and the temperature measurement device 10 according to the foregoing embodiment will be mainly described with reference to the accompanying drawings.

In the illustrated embodiment, the temperature measurement device 20 includes a housing 100 and a cable pad portion 300.

The housing 100 of the temperature measurement device 20 according to this embodiment is similar in function and shape to the temperature measurement device 10 according to the foregoing embodiment. That is, the first housing 110, the second housing 120, the cable through-hole portion 130, the power line through-hole portion 140, the housing coupling portion 150, and the housing fastening portion 160 provided in the housing 100 have the same shape and function as each element of the housing 100 according to the foregoing embodiment.

However, in the case of the housing 100 according to this embodiment, there is a difference in that the cable pad portion 300 is disposed in the first space S1 and the second space S2.

The cable pad portion 300 is coupled to the optical cable C to prevent an arbitrary movement of the optical cable C. Additionally, the cable pad portion 300 restrains the optical cable C to be maintained at a position surrounding the power line W.

The cable pad portion 300 is accommodated in the inner space of the housing 100. Specifically, the cable pad portion 300 may be disposed to surround the power line W in the inner space of the housing 100.

In the illustrated embodiment, the cable pad portion 300 includes a cable pad 310 and a pad support portion 320.

Referring to FIG. 6, the cable pad 310 is provided in the form of a pad formed of an elastic material.

An optical cable C is coupled to the cable pad 310 to pass therethrough. Here, as the cable pad 310 is formed of an elastic material, the shape of the cable pad 310 may be deformed in shape even when the optical cable C is passed therethrough.

Additionally, the cable pad 310 may be formed of a material having a high frictional force with respect to a member in contact therewith. Accordingly, the power line W supported by the cable pad 310 may be maintained at a predetermined position by the frictional force of the cable pad 310.

In one embodiment, the cable pad 310 may be formed of a silicon material.

The optical cable C may be extended in various shapes within the cable pad 310. In the illustrated embodiment, the optical cable C includes eight curved portions, and extends while changing directions at least eight times.

The optical cable C may extend in an arbitrary form that can secure a sufficient length to measure the temperature of the power line W.

The cable pad 310 may be accommodated in the inner space of the housing 100 and disposed to surround the power line W. Specifically, the cable pad 310 is seated on the pad support portion 320 disposed in the inner space of the housing 100.

Figure 7:
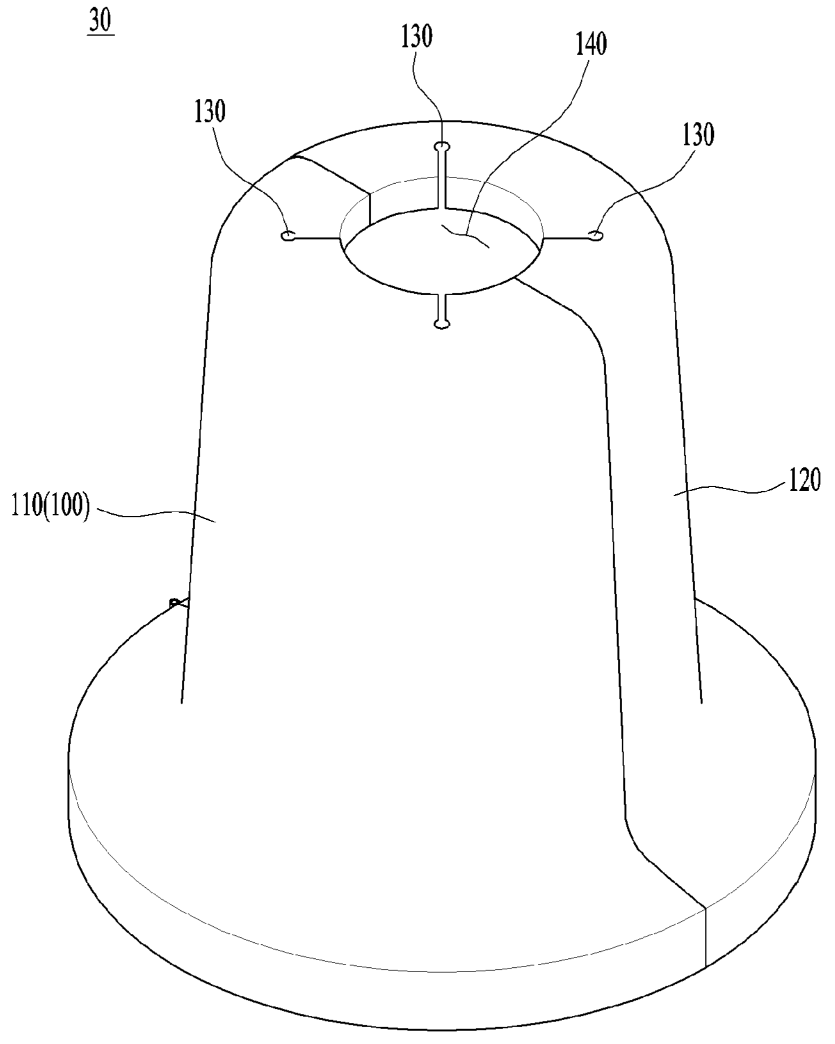
FIG. 7 is a perspective view showing a temperature measurement device according to still another embodiment of the present disclosure.

Referring to FIG. 7, the pad support portion 320 is disposed in the inner space of the housing 100. The pad support portion 320 is a portion on which the cable pad 310 is seated. In other words, the pad support portion 320 supports the cable pad 310.

The pad support portion 320 may be disposed in plurality. The plurality of pad support portions 320 may be located in different spaces inside the housing 100. In the illustrated embodiment, the pad support portions 320 are disposed in the first space S1 of the first housing 110 and the second space S2 of the second housing 120, respectively.

The pad support portion 320 may extend along a direction in which the housing 100 extends. In the embodiment shown in FIG. 5, the pad support portion 320 extends in a front-to-rear direction.

The pad support portion 320 may be disposed to have a predetermined height. Here, the pad support portion 320 extends in a top-bottom direction by a length shorter than that of the first housing 110 or the second housing 120.

Accordingly, an upper end portion of the pad support portion 320 is located lower than that of the first housing 110 or the second housing 120. The cable pad 310 may be seated in a space formed by the step. In one embodiment, a thickness of the cable pad 310 may be disposed to be less than or equal to the step.

The pad support portion 320 may include a plurality of portions having different shapes. In the illustrated embodiment, the pad support portion 320 includes a first extension portion 321, a second extension portion 322, and a third extension portion 323 that are continuous with one another in a direction from the outside to the inside.

The first extension portion 321 is a portion on which a portion of the cable pad 310 is seated. The first extension portion 321 is disposed to surround the inner space of the housing 100 on one side in a width direction.

In the embodiment shown in FIG. 5, the first extension portion 321 is disposed to surround the first space S1 of the first housing 110 or the second space S2 of the second housing 120 from the outside. That is, when the first housing 110 and the second housing 120 are open, the first extension portions 321 are located on a left side of the first space S1 and on a right side of the second space S2, respectively.

The first extension portion 321 extends toward the first space S1 or the second space S2. In the illustrated embodiment, the first extension portion 321 extends in a left-right direction. Here, the first extension portion 321 may extend to have a predetermined height.

The first extension portion 321 is disposed to face the third extension portion 323 with the second extension portion 322 therebetween. Here, a height of the first extension portion 321 and a height of the third extension portion 323 may be the same. Additionally, the first extension portion 321 and the third extension portion 323 may be disposed to have the same length in a width direction thereof (that is, a left-right direction in the illustrated embodiment).

The first extension portion 321 is continuous with the second extension portion 322.

The second extension portion 322 surrounds the first space S1 or the second space S2 from one side, or a lower side in the embodiment shown in FIG. 5. The second extension portion 322 extends between the first extension portion 321 and the third extension portion 323.

The second extension portion 322 may extend in the form of a curved surface having a predetermined curvature. In the illustrated embodiment, the second extension portion 322 extends in a left-right direction, and is disposed in a rounded manner to be convex downward. A space formed by the shape of the second extension portion 322 may be defined as the first space S1 or the second space S2.

The second extension portion 322 is continuous with the third extension portion 323.

The first extension portion 323 is disposed to surround the inner space of the housing 100 on the other side in a width direction. In the embodiment shown in FIG. 5, the third extension portion 323 is disposed to surround the first space S1 or the second space S2 from the inside. That is, when the first housing 110 and the second housing 120 are open, the third extension portions 323 are located on a right side of the first space S1 and on a left side of the second space S2, respectively.

Accordingly, the pad support portion 320 is disposed to include the first extension portion 321 and the third extension portion 323 whose cross-sections are horizontal, and a second extension portion 322 in a rounded manner to be convex downward therebetween.

As described above, the cable pad 310 is formed of an elastic material to be deformable in shape. Accordingly, it will be understood that the cable pad 310 is seated on the first extension portion 321 and the third extension portion 323, and then pressed toward the second extension portion 322 by the power line W so as to be deformed in shape and located adjacent to the second extension portion 322.

Figure 8:
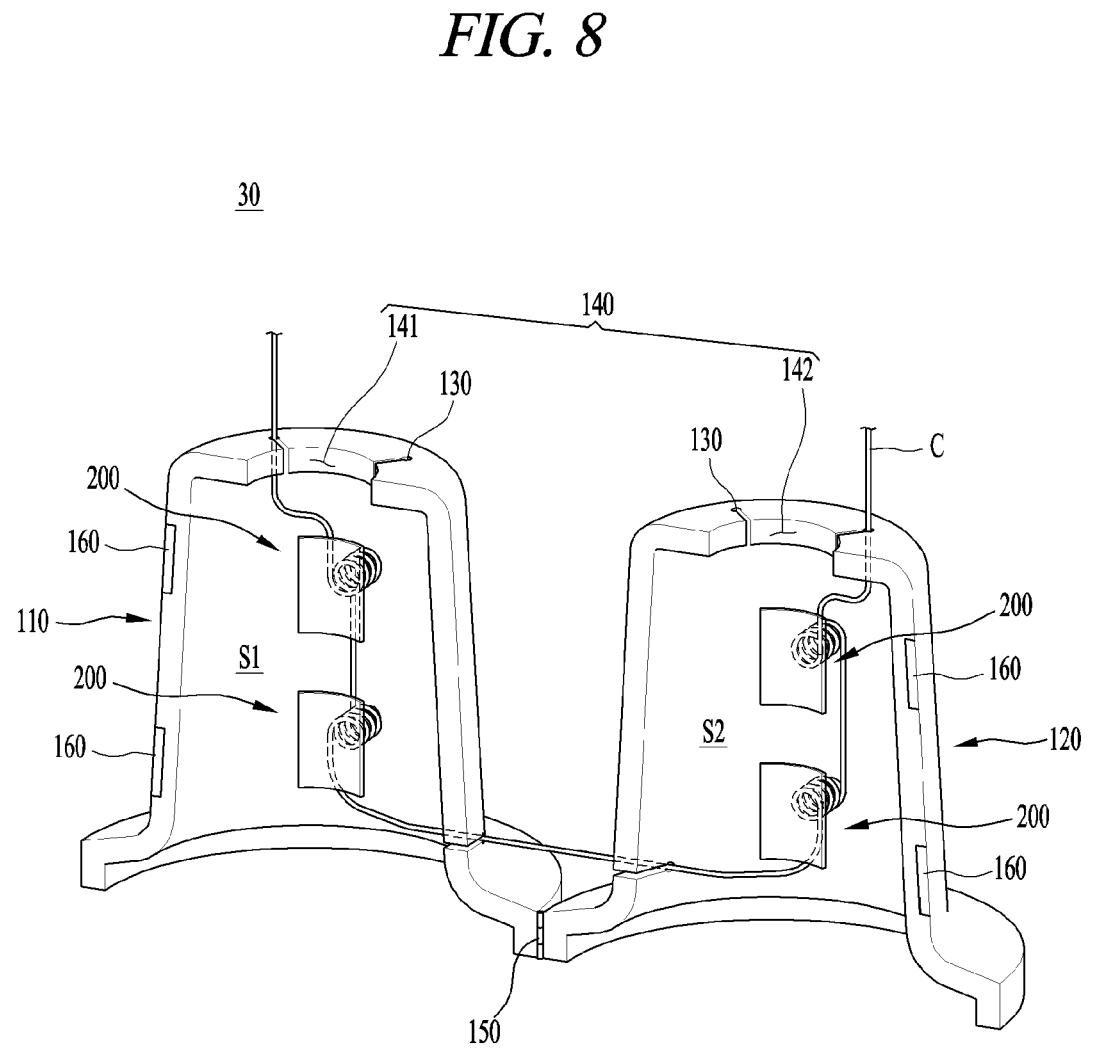

(3) Description of Temperature Measurement Device 30 According to Still Another Embodiment of Present Disclosure Referring to FIGS. 7 and 8, a temperature measurement device 30 according to still another embodiment of the present disclosure is shown.

The temperature measurement device 30 according to the this embodiment has a difference in the shape of the housing 100 when compared to the temperature measurement device 10 according to the foregoing embodiment.

Accordingly, differences between the temperature measurement device 30 according to this embodiment and the temperature measurement device 10 according to the foregoing embodiment will be mainly described with reference to the accompanying drawings.

In the illustrated embodiment, the temperature measurement device 30 includes a housing 100 and a cable winding portion 200.

The housing 100 according to this embodiment, unlike the temperature measurement device 10 according to the foregoing embodiment, has a cup or bell shape, which has a similar shape to an insulating cap coupled to an insulator I of a transformer T or the like.

Therefore, the temperature measurement device 30 according to the this embodiment may be provided with the housing 100 instead of the insulating cap, so as to cover the insulator I while at the same time measuring the temperature of the power line W carrying current through the transformer T.

In the illustrated embodiment, the housing 100 includes a first housing 110, a second housing 120, a cable through-hole portion 130, a power line through-hole portion 140, a housing coupling portion 150, and a housing fastening portion 160.

The cable through-hole portion 130, the power line through-hole portion 140, the housing coupling portion 150, and the housing fastening portion 160 of this embodiment have the same structures and functions as the cable through-hole portion 130, the power line through-hole portion 140, the housing coupling portion 150, and the housing fastening portion 160 according to the foregoing embodiment.

However, the housing 100 according to this embodiment has a difference in shape between the first housing 110 and the second housing 120.

The first housing 110 and the second housing 120 have an opening portion disposed on one side thereof to accommodate the insulator I. In the embodiment shown in FIG. 8, the opening portion is disposed on a lower side of the first housing 110 and the second housing 120.

The opening portion, together with the cable through-hole portion 130 and the power line through-hole portion 140, communicates between an inner space of the housing 100, that is, the first space S1 and the second space S2, and the outside.

Accordingly, it will be understood that a diameter of the opening portion is disposed to be larger than that of the insulator I.

As a result, it will be understood that a cross-sectional area of an upper end portion of the housing 100 is smaller than that of a lower end portion of the housing 100 (i.e., an end portion in a direction in which the insulator I is accommodated therein).

3. Description of Aspect of Using Temperature Measurement Device 10, 20, 30 According to Embodiment of Present Disclosure The temperature measurement device 10, 20, 30 according to each embodiment of the present disclosure as described above may be coupled to a power line W to pass therethrough. The optical cable C may be disposed to surround an outer periphery of the power line W coupled thereto, so that the form of light traveling along the optical cable C may be changed in response to a temperature change of the power line W. Using this, a temperature change of the power line W may be accurately detected in real time.

Hereinafter, an aspect of using the temperature measurement device 10, 20, 30 according to an embodiment of the present disclosure will be described in detail with reference to FIGS. 9 to 15.

In the illustrated embodiment, it is shown that the power line W is transparent for the sake of convenience of understanding.

Figure 9:
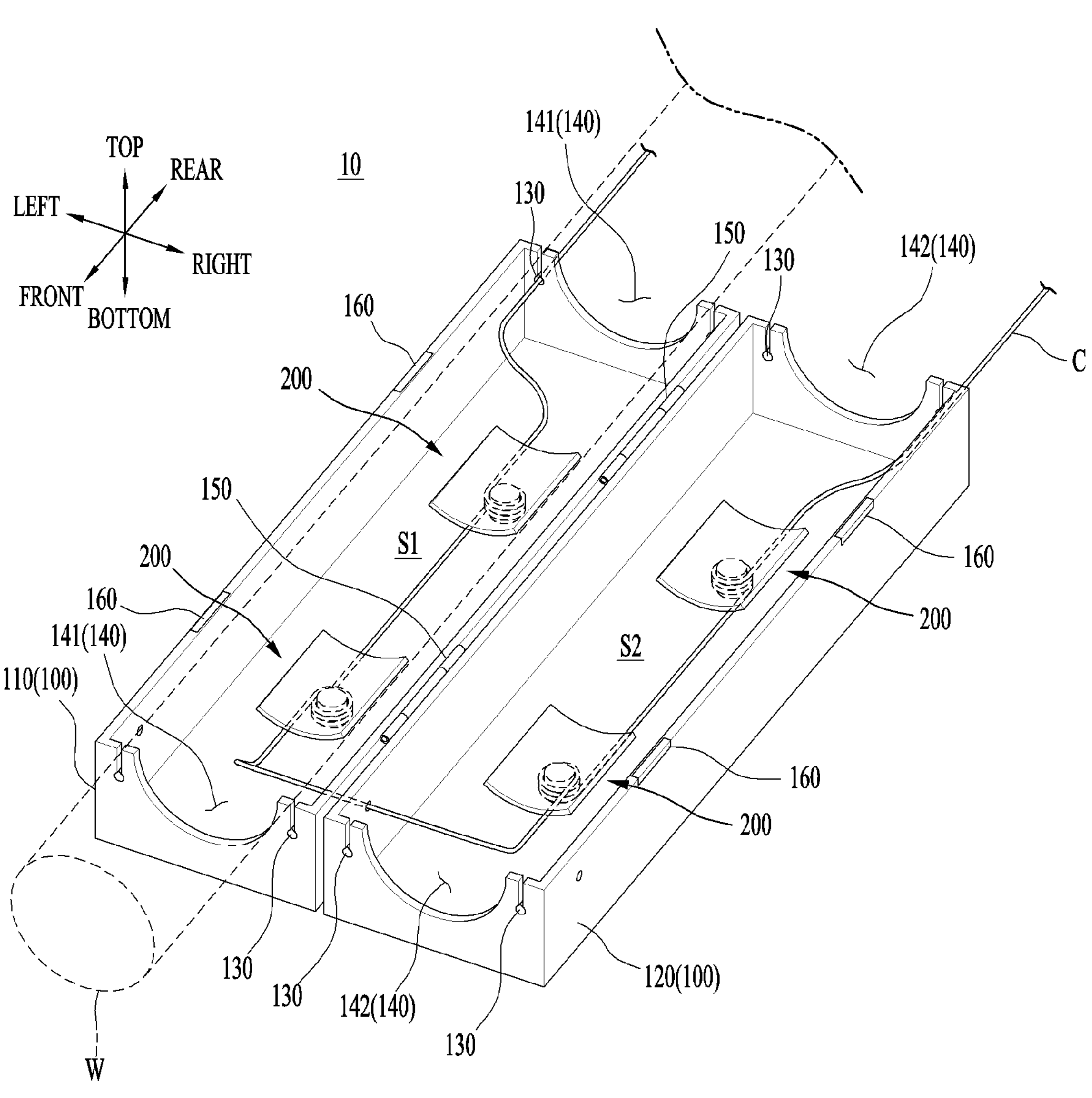
FIG. 9 is an open perspective view showing the temperature measurement device of FIG. 2 coupled to a power line.

(1) Description of Aspect of Using Temperature Measurement Device 10 According to One Embodiment of Present Disclosure Hereinafter, an aspect of using the temperature measurement device 10 according to one embodiment of the present disclosure will be described with reference to FIGS. 9 and 10.

The power line W is coupled to the temperature measurement device 10 to pass therethrough so as to be partially accommodated in an inner space of the housing 100. In the embodiment shown in FIG. 9, the power line W is partially accommodated in the first space S1 of the first housing 110. Alternatively, it will be understood that the power line W may be partially accommodated in the second space S2 of the second housing 120.

Here, respective end portions in a direction in which the power line W extends, front and the rear end portions in the illustrated embodiment, are inserted into the first power line through-hole portion 141 disposed on front and rear sides of the first housing 110.

The accommodated power line W is supported by the cable winding portion 200. In the embodiment shown in FIG. 9, the power line W is supported on the support members 220 of the two cable winding portions 200 disposed in the first space S1 of the first housing 110.

Here, it will be understood that the optical cable C extends in the first space S1 and the second space S2 of the housing 100, and is partially wound around the column member 210 of the cable winding portion 200. Each end portion in an extension direction of the optical cable C is exposed to the outside through the cable through-hole portion 130.

When the first housing 110 or the second housing 120 is rotated toward each other while the power line W is accommodated therein, a coupling between the temperature measurement device 10 and the power line W is completed.

Figure 10:
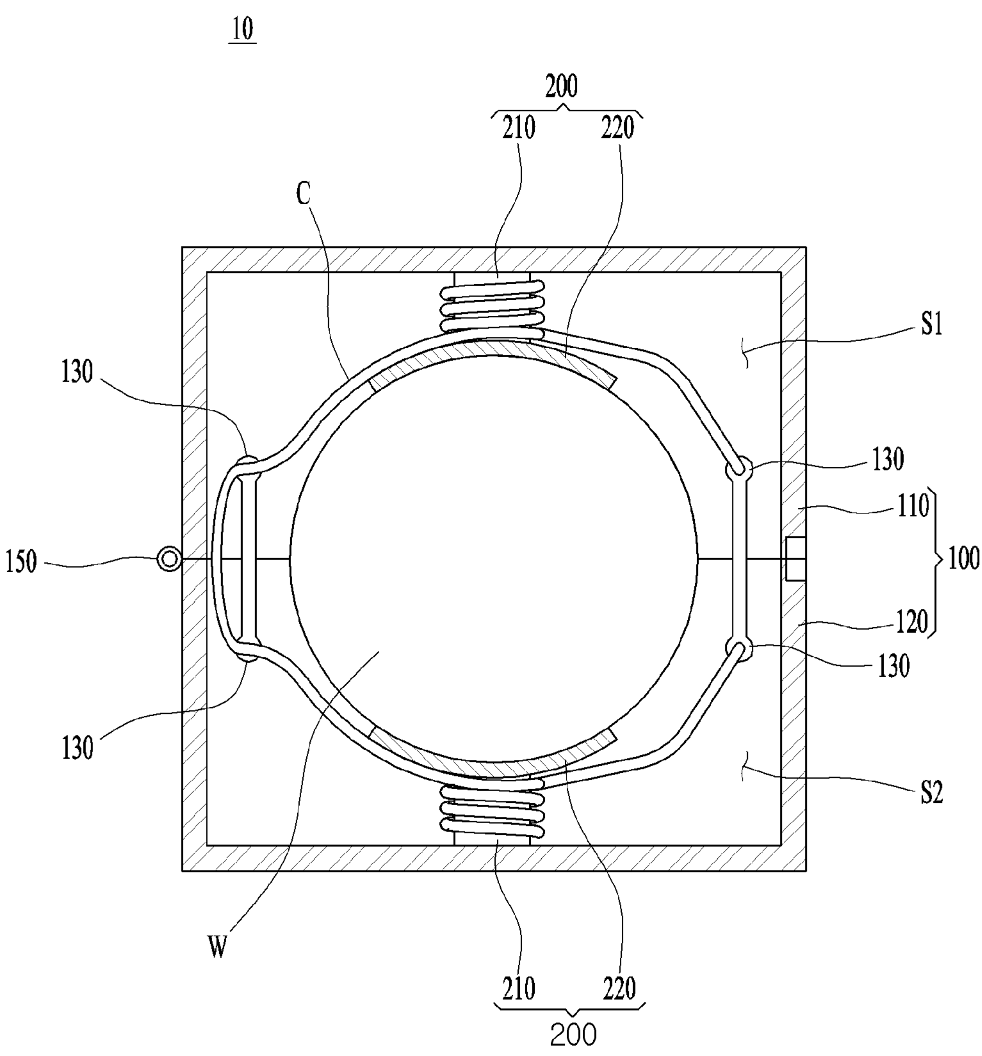
FIG. 10 is a cross-sectional view showing the state of FIG. 9.

As shown in FIG. 10, the outer periphery of the power line W is supported by the power line through-hole portion 140. Here, one portion and the other portion of the outer periphery of the power line W are also supported by the support member 220 of the cable winding portion 200.

In the embodiment shown in FIG. 10, a part of an upper outer periphery of the power line W and a part of a lower outer periphery of the power line W are supported by the support member 220. In the illustrated embodiment, it will be understood that a part of the upper outer periphery of the power line W is supported by the cable winding portion 200 provided in the first housing 110, and a part of the lower outer periphery of the power line W by the cable winding portion 200 provided in the second housing 120.

In addition, the optical cable C extends from an inner space of the housing 100 through the cable through-hole portion 130, and then extends to an outside of the housing 100 again through the cable through-hole portion 130.

Therefore, the temperature measurement device 10 according to this embodiment may be provided with the cable winding portion 200 to allow the winding of the optical cable C, maintain a stable shape thereof, and stably support the power line W.

The first housing 110 and the second housing 120 may be rotatably coupled to each other by the housing coupling portion 150 to manipulate the inner space of the housing 100 to be open in order to place the power line W or the optical cable C therein.

In addition, the first housing 110 and the second housing 120 may be manipulated to close the inner space of the housing 100 in order to accommodate the power line W or the optical cable C accommodated in the inner space of the housing 100.

In addition, the first housing 110 and the second housing 120 coupled to each other may be stably maintained in a coupled state by the housing fastening portion 160. Here, as described above, a coupled state between the power line W and the temperature measurement device 10 may be stably maintained by the anti-slip portion 400.

Figure 11:
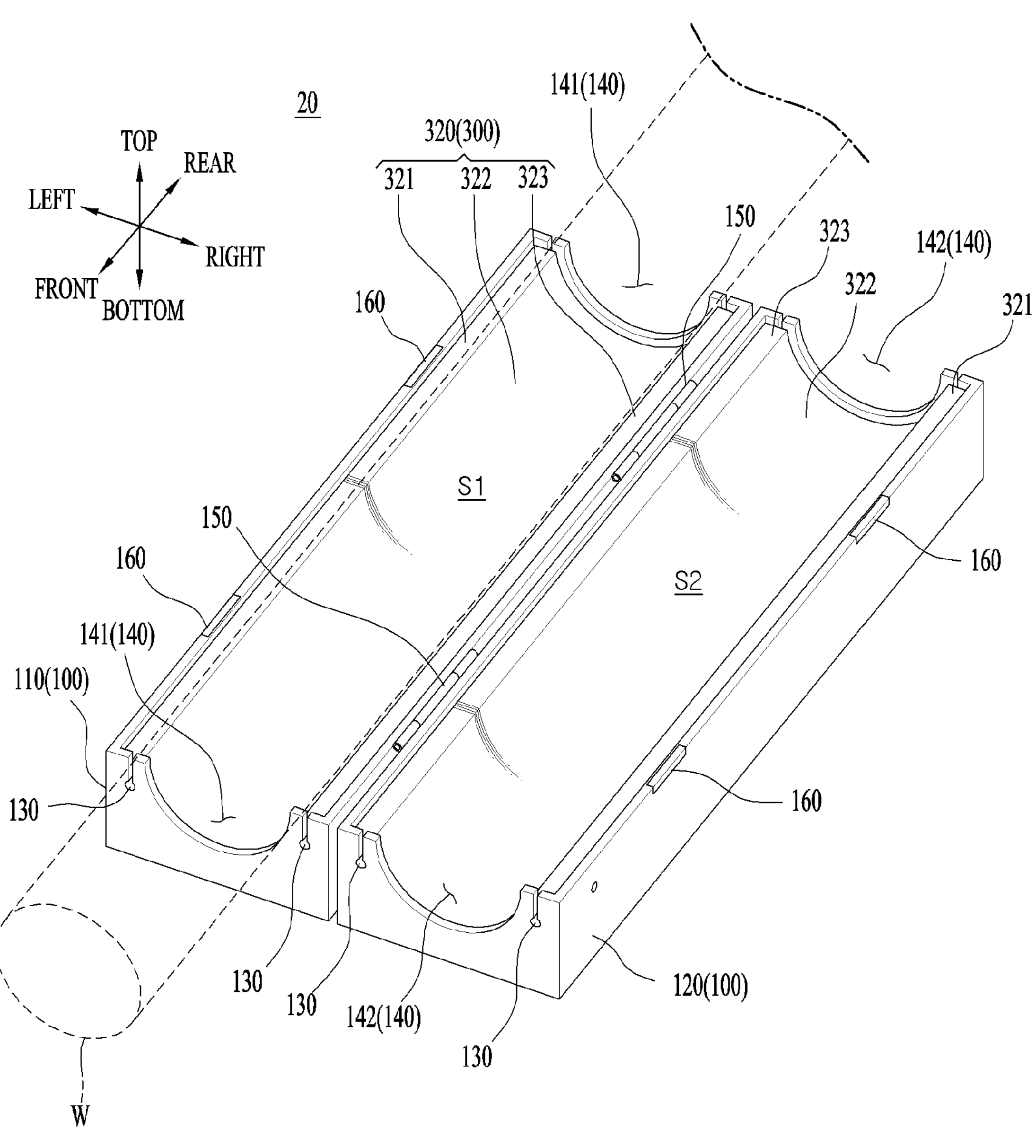
FIG. 11 is an open perspective view showing the temperature measurement device of FIG. 5 coupled to a power line.

(2) Description of Aspect of Using Temperature Measurement Device 20 According to Another Embodiment of Present Disclosure Hereinafter, an aspect of using the temperature measurement device 20 according to another embodiment of the present disclosure will be described with reference to FIGS. 11 and 12.

The power line W is coupled to the temperature measurement device 20 to pass therethrough so as to be accommodated in an inner space of the housing 100. In the embodiment shown in FIG. 11, the power line W is partially accommodated in the first space S1 of the first housing 110. Alternatively, it will be understood that the power line W may be partially accommodated in the second space S2 of the second housing 120.

Here, respective end portions in a direction in which the power line W extends, front and the rear end portions in the illustrated embodiment, are inserted into the first power line through-hole portion 141 disposed on front and rear sides of the first housing 110.

Additionally, although not shown, the cable pad 310 of the cable pad portion 300 is seated on the pad support portion 320. As described above, the cable pad 310 is formed of an elastic material.

Accordingly, the cable pad 310 may be placed to come in contact with the first extension portion 321, the second extension portion 322, and the third extension portion 323 of the pad support portion 320 having different shaped surfaces, respectively.

The accommodated power line W is supported by the pad support portion 320 while covering the cable pad 310. In the illustrated embodiment, the power line W is supported on the second extension portion 322 of the pad support portion 320 disposed in the first space S1 of the first housing 110.

Here, the optical cable C is accommodated in the inner space of the housing 100 together with the cable pad 310 in a state of being passed through the cable pad 310. It will be understood that each end portion in an extension direction of the optical cable C extends to the outside through the cable through-hole portion 130.

When the first housing 110 or the second housing 120 is rotated toward each other while the power line W is accommodated therein, a coupling between the temperature measurement device 20 and the power line W is completed.

Figure 12:
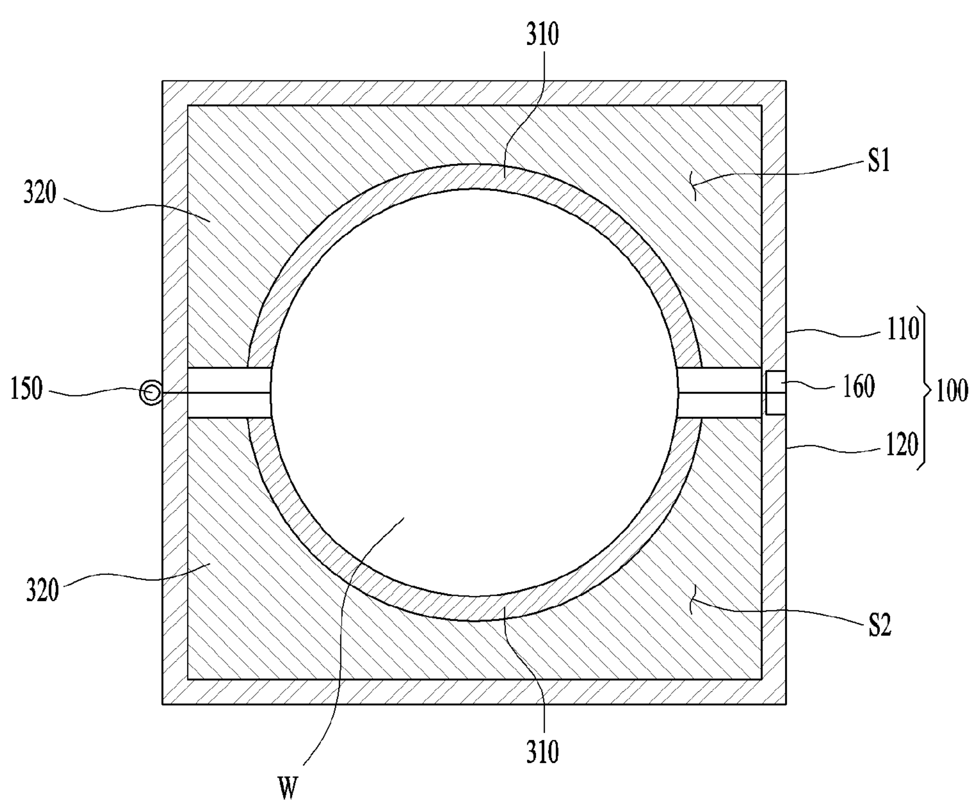
FIG. 12 is a cross-sectional view showing the state of FIG. 11.

As shown in FIG. 12, the outer periphery of the power line W is supported by the power line through-hole portion 140. Here, one portion and the other portion of the outer periphery of the power line W are also supported by the pad support portion 320 of the cable pad portion 300.

In the embodiment shown in FIG. 12, a part of an upper outer periphery of the power line W and a part of a lower outer periphery of the power line W are supported by the pad support portion 320. In the illustrated embodiment, it will be understood that a part of the upper outer periphery of the power line W is supported by the pad support portion 320 provided in the first housing 110, and a part of the lower outer periphery of the power line W by the pad support portion 320 provided in the second housing 120.

In addition, the optical cable C extends from an inner space of the housing 100 through the cable through-hole portion 130 while being accommodated in the cable pad 310, and then extends to an outside of the housing 100 again through the cable through-hole portion 130.

Here, it will be understood that the cable pad 310 to which the optical cable C is coupled is located between the power line W and the pad support portion 320.

Therefore, the temperature measurement device 20 according to this embodiment may be provided with the cable pad portion 300 to prevent the twist or the like of the optical cable C while at the same time stably supporting the power line W.

The first housing 110 and the second housing 120 may be rotatably coupled to each other by the housing coupling portion 150 to manipulate the inner space of the housing 100 to be open in order to place the power line W or the optical cable C therein.

In addition, the first housing 110 and the second housing 120 may be manipulated to close the inner space of the housing 100 in order to accommodate the power line W or the optical cable C accommodated in the inner space of the housing 100.

Furthermore, the first housing 110 and the second housing 120 coupled to each other may be stably maintained in a coupled state by the housing fastening portion 160. Here, as described above, a coupled state between the power line W and the temperature measurement device 20 may be stably maintained by a frictional force of the cable pad 310 itself and the anti-slip portion 400.

Figure 13:
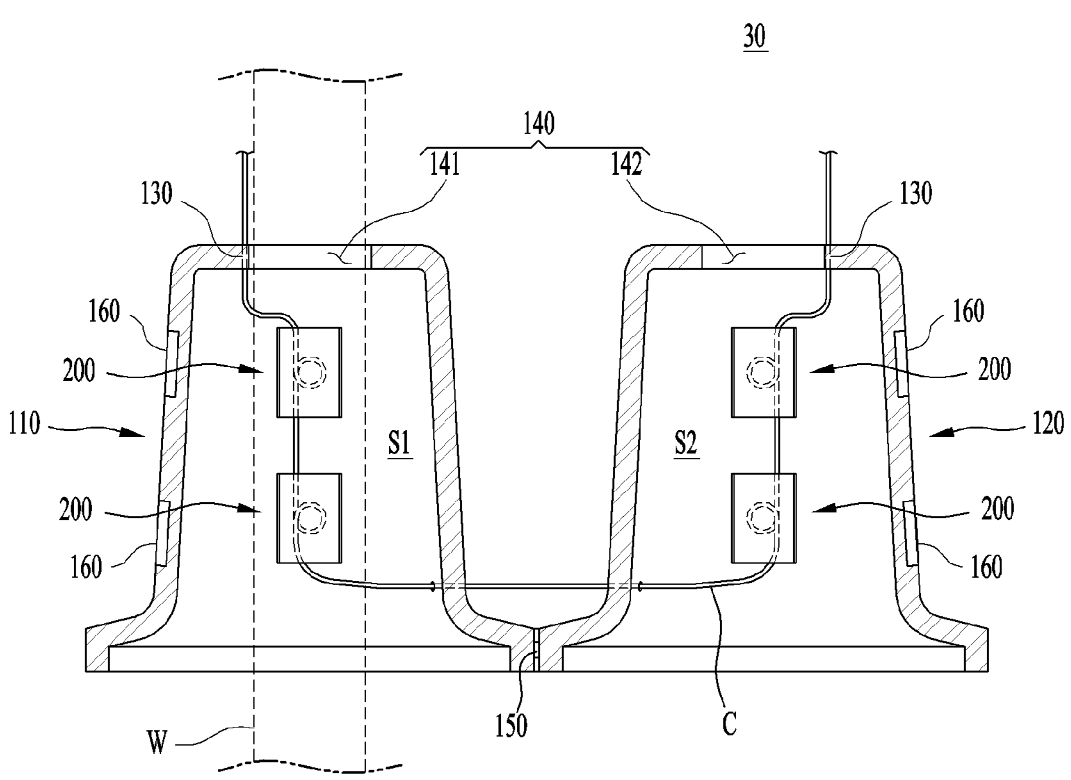
FIG. 13 is an open front view showing the temperature measurement device of FIG. 7 coupled to a power line.

(3) Description of Aspect of Using Temperature Measurement Device 30 According to Still Another Embodiment of Present Disclosure Hereinafter, an aspect of using the temperature measurement device 30 according to still another embodiment of the present disclosure will be described with reference to FIG. 13.

The power line W is coupled to the temperature measurement device 30 to pass therethrough so as to be accommodated in an inner space of the housing 100. In the embodiment shown in FIG. 13, the power line W is partially accommodated in the first space S1 of the first housing 110. Alternatively, it will be understood that the power line W may be partially accommodated in the second space S2 of the second housing 120.

Here, one end portion in a direction in which the power line W extends, a rear end portion in the illustrated embodiment, is inserted into the first power line through-hole portion 141 disposed on a rear side of the first housing 110.

Additionally, the other end portion in a direction in which the power line W extends, a front end portion in the illustrated embodiment, passes through an opening portion disposed to be open on a front side of the first housing 110.

The accommodated power line W is supported by the cable winding portion 200. In the embodiment shown in FIG. 13, the power line W is supported on the support members 220 of the two cable winding portions 200 disposed in the first space S1 of the first housing 110.

Here, it will be understood that the optical cable C extends in the first space S1 and the second space S2 of the housing 100, and is partially wound around the column member 210 of the cable winding portion 200. Each end portion in an extension direction of the optical cable C is exposed to the outside through the cable through-hole portion 130.

When the first housing 110 or the second housing 120 is rotated toward each other while the power line W is accommodated therein, a coupling between the temperature measurement device 30 and the power line W is completed.

When a coupling between the temperature measurement device 30 and the power line W is completed, the outer periphery of the power line W is supported by the power line through-hole portion 140. Here, one portion and the other portion of the outer periphery of the power line W are also supported by the support member 220 of the cable winding portion 200.

A part of an upper outer periphery of the power line W and a part of a lower outer periphery of the power line W are supported by the support member 220. It will be understood that a part of the upper outer periphery of the power line W is supported by the cable winding portion 200 provided in the first housing 110, and a part of the lower outer periphery of the power line W by the cable winding portion 200 provided in the second housing 120.

In addition, the optical cable C extends in the inner space of the housing 100 through the cable through-hole portion 130 or an opening portion disposed on a front side of the housing 100, and then extends to an outside of the housing 100 again through the cable through-hole portion 130 or the opening portion disposed on the front side of the housing.

Therefore, the temperature measurement device 30 according to this embodiment may be provided with the cable winding portion 200 to allow the winding of the optical cable C, maintain a stable shape thereof, and stably support the power line W.

The first housing 110 and the second housing 120 may be rotatably coupled to each other by the housing coupling portion 150 to manipulate the inner space of the housing 100 to be open in order to place the power line W or the optical cable C therein.

In addition, the first housing 110 and the second housing 120 may be manipulated to close the inner space of the housing 100 in order to accommodate the power line W or the optical cable C accommodated in the inner space of the housing 100.

In addition, the first housing 110 and the second housing 120 coupled to each other may be stably maintained in a coupled state by the housing fastening portion 160. Here, as described above, a coupled state between the power line W and the temperature measurement device 30 may be stably maintained by the anti-slip portion 400.

Furthermore, the housing 100 of the temperature measurement device 30 according to this embodiment is disposed in the shape of an existing insulating cup coupled to the insulator I of the transformer T. Therefore, it may be possible to prevent the insulator I from being exposed to the outside by replacing the existing insulating cup as well as to measure the temperature of the power line W connected to the transformer T.

(4) Description of Aspect of Installing Temperature Measurement Device 10, 20, 30 According to Embodiment of Present Disclosure Hereinafter, an aspect of installing the temperature measurement device 10, 20, 30 according to an embodiment of the present disclosure will be described in detail with reference to FIGS. 14 and 15.

Figure 14:
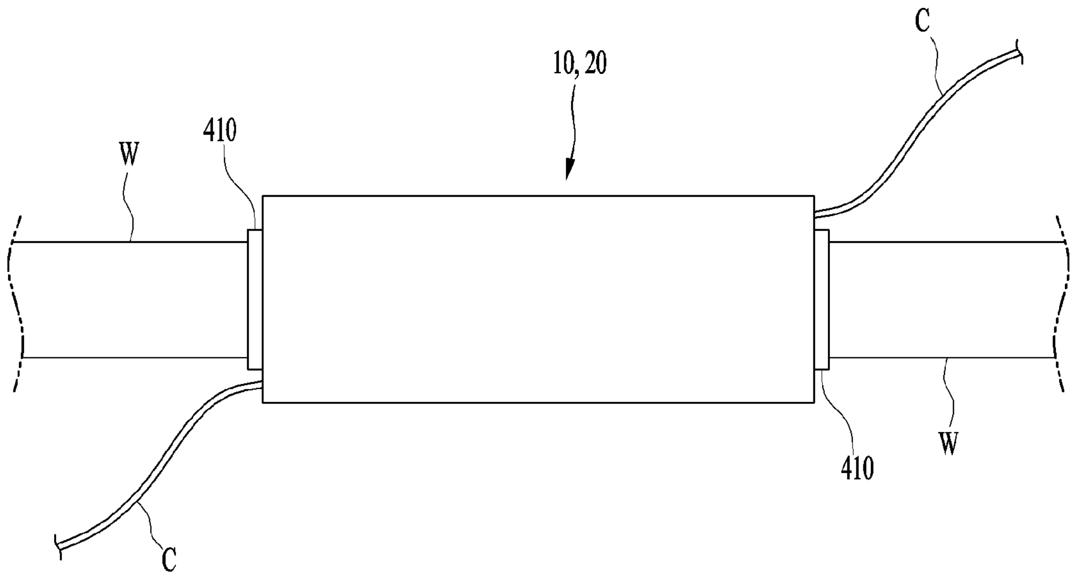
FIG. 14 is a conceptual diagram showing a state in which a temperature measurement device according to an embodiment of the present disclosure is coupled to a power line.

Referring to FIG. 14, it is shown a state in which the temperature measurement device 10, 20 according to an embodiment of the present disclosure is installed on the power line W. As described above, the temperature measurement device 10, 20 is coupled to the power line W while surrounding an outer periphery of the power line W.

Here, the temperature measurement devices 10, 20 may be provided with the clip member 410 of the anti-slip portion 400 to maintain a relative position with respect to the power line W.

Figure 15:
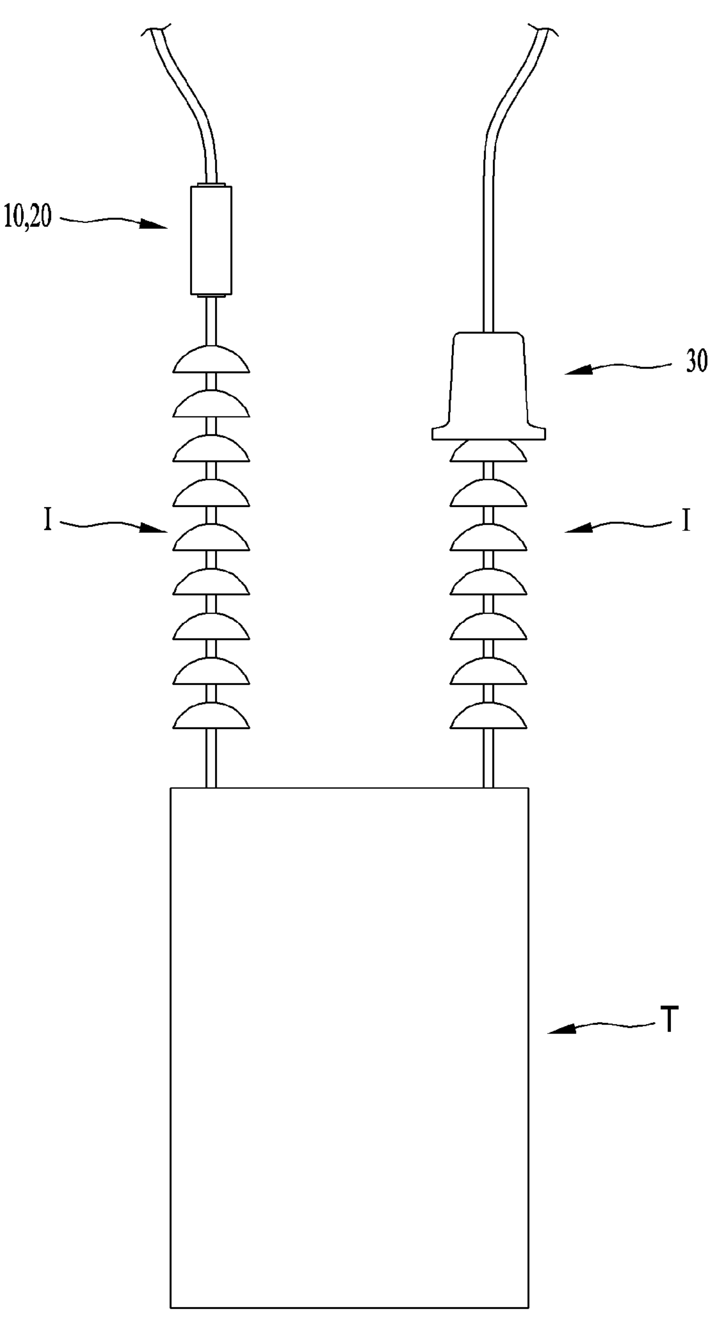
FIG. 15 is a conceptual diagram showing a state in which a temperature measurement device according to an embodiment of the present disclosure is coupled to a transformer.

Referring to FIG. 15, it is shown that the temperature measurement devices 10, 20, 30 according to an embodiment of the present disclosure is installed adjacent to the transformer T.

It is assumed that the temperature measurement device 10, 20 according to an embodiment of the present disclosure is installed on the power line W itself. Accordingly, as shown on a left side of FIG. 15, the temperature measurement device 10, 20 is installed on the power line W connected to the transformer T.

Although not shown, as described above, a clip member 410 may be provided to maintain the position of the temperature measurement device 10, 20.

Meanwhile, it is assumed that the temperature measurement device 30 according to still another embodiment of the present disclosure is installed on the insulator I provided in the transformer T. Accordingly, as shown on a right side of FIG. 15, the temperature measurement device 30 is coupled to the power line W while covering any one of the insulators (I) of the transformer T.

Therefore, the temperature measurement device 10, 20, 30 according to an embodiment of the present disclosure may be installed adjacent to the transformer T or both on the transformer T and the power line W spaced apart therefrom to detect the temperature of the power line W.

Though the present disclosure has been described with reference to preferred embodiments thereof, it will be apparent to those skilled in the art that various changes and modifications can be made without departing from the concept and scope of the invention as defined in the following claims.

In the above, specific embodiments of the present disclosure have been shown and described. However, the present disclosure can be implemented in various embodiments without departing from the concept or gist of the invention, and thus the foregoing embodiments should not be limited to the details of the present disclosure.

Furthermore, the foregoing embodiments should be broadly construed within the scope of the technical concept defined by the appended claims even though not specifically disclosed in the detailed description herein. Moreover, all changes and modifications within the technical scope of the claims and the equivalent scope thereof should be construed to be included in the appended claims.

The invention claimed is:

1. A temperature measurement device comprising:

a housing disposed inside a space through which a power line and an optical cable pass, and disposed to extend in one direction, which is a direction in which the power line extends; and a cable winding portion disposed in the space of the housing to support the power line passed therethrough, wherein the cable winding portion comprises:

a column member connected to an inner surface of the housing and disposed to extend in the space to wind the optical cable passed therethrough; and a support member that at least partially supports an outer periphery of the power line passed therethrough wherein the column member is configured such that one end portion of the column member in an extension direction thereof is coupled to an inner surface of the housing, and the other end portion in an extension direction thereof is coupled to the support member.

2. The temperature measurement device of claim 1, wherein the column member is configured such that a cross-sectional area based on a plane forming a predetermined angle with respect to an extension direction thereof is disposed to be smaller than that of the support member based on the same plane.

3. The temperature measurement device of claim 1, wherein the power line is disposed to have a predetermined cross-section and to extend in the one direction, and wherein the support member is disposed to have a cross-sectional shape corresponding to a shape of the cross-section of the power line.

4. The temperature measurement device of claim 1, wherein the housing comprises:

a plurality of power line through-hole portions disposed to pass through each end portion in the one direction to communicate between the space and the outside, and through which the power line passes; and a cable through-hole portion disposed to pass through an outer periphery surrounding the space to communicate between the space and the outside, and through which an optical cable for detecting the temperature of the power line passes.

5. The temperature measurement device of claim 4, wherein the cable through-hole portion comprises:

an accommodation space disposed to pass through an outer periphery of the housing to accommodate the optical cable;

a guide groove disposed to pass through the outer periphery of the housing, and to extend between the accommodation space and the outside to communicate with the accommodation space and the outside; and a fixing protrusion that protrudes toward the accommodation space from an outer periphery surrounding the accommodation space to support the optical cable accommodated in the accommodation space.

6. The temperature measurement device of claim 1, wherein the cable winding portion are provided in plurality, and the plurality of cable winding portions are disposed to be spaced apart from one another along the one direction, and wherein the optical cable passing through the space of the housing extends after being wound around at least one cable winding portion from among the plurality of cable winding portions.

7. The temperature measurement device of claim 1, wherein the housing comprises:

a first housing constituting a part of the other direction and having a first space therein; and a second housing constituting the remaining part of the other direction, and forming a second space that communicates with the first space to form the space of the housing therein, and wherein the cable winding portion is provided in plurality, and the plurality of cable winding portions are disposed in at least one of the first space and the second space.

8. The temperature measurement device of claim 7, wherein the plurality of cable winding portions are disposed in each of the first space and the second space, wherein the plurality of cable winding portions respectively disposed in the first space and the second space are disposed to be spaced apart from one another along the one direction, and wherein the optical cable passing through the space of the housing is wound around at least one of the plurality of cable winding portions disposed in either one of the first space and the second space, and then extends while being wound around at least one of the plurality of cable winding portions disposed in the other one of the first space and the second space.

9. The temperature measurement device of claim 7, wherein the housing comprises:

a housing coupling portion rotatably connecting the first housing and the second housing; and a housing fastening portion provided in each of the first housing and the second housing to maintain a coupled state between the first housing and the second housing.

10. The temperature measurement device of claim 9, wherein the housing coupling portion is provided with a hinge member, and wherein the housing fastening portion is provided with a magnetic member.

11. A temperature measurement device comprising:

a housing disposed inside a space through which a power line and an optical cable pass, and disposed to extend in one direction, which is a direction in which the power line extends; and a cable pad portion disposed in the space of the housing to support the power line passed therethrough, wherein the cable pad portion comprises:

a cable pad to which the optical cable is coupled to pass therethrough, and formed of an elastic material so as to be deformable in shape; and a pad support portion on which the cable pad is seated to support the power line passed therethrough, and to partially surround the space wherein the cable pad and the optical cable are disposed to surround the power line.

12. The temperature measurement device of claim 11, wherein the pad support portion comprises:

a first extension portion extending in the other direction;

a second extension portion that is continuous with the first extension portion, and extends in a rounded manner to be convex in another direction; and a third extension portion that is continuous with the second extension portion and extends in the other direction.

13. The temperature measurement device of claim 12, wherein a length of the first extension portion and the third extension portion along the another direction is disposed to be shorter than that of the housing along the another direction.

14. The temperature measurement device of claim 13, wherein a thickness of the cable pad is disposed to be less than or equal to a difference between the length of the first extension portion and the third extension portion and the length of the housing.

15. The temperature measurement device of claim 11, wherein the housing comprises:

a first housing constituting a part of the other direction and having a first space therein; and a second housing constituting the remaining part of the other direction, and forming a second space that communicates with the first space to form the space of the housing therein, and wherein the cable pad is provided in plurality, and the plurality of cable pad portions are disposed in the first space and the second space, respectively.

16. A temperature measurement device comprising:

a housing disposed inside a space through which a power line and an optical cable pass, and disposed to extend in one direction, which is a direction in which the power line extends; and a cable winding portion disposed in the space of the housing to support the power line passed therethrough, wherein the housing is configured such that either one of each of end portions along the one direction is disposed to be open, and a cross-sectional area of the other one of each of the end portions along the one direction is disposed to be smaller than that of the either one end portion, and wherein the cable winding portion comprises:

a column member connected to an inner surface of the housing and disposed to extend in the space to wind the optical cable passed therethrough; and a support member coupled to an end portion of the column member to at least partially support an outer periphery of the power line passed therethrough, wherein the column member is configured such that one end portion of the column member in an extension direction thereof is coupled to an inner surface of the housing, and the other end portion in an extension direction thereof is coupled to the support member.

17. The temperature measurement device of claim 16, wherein an insulator provided in a transformer is inserted into either one of the end portions of the housing, and wherein an inner surface of the other end portion of the housing is seated and supported on the insulator.

* * * * *